United States Patent
Ikesu et al.

(10) Patent No.: US 12,510,591 B2
(45) Date of Patent: Dec. 30, 2025

(54) SEMICONDUCTOR FAILURE ANALYSIS DEVICE AND SEMICONDUCTOR FAILURE ANALYSIS METHOD

(71) Applicant: HAMAMATSU PHOTONICS K.K., Hamamatsu (JP)

(72) Inventors: Masataka Ikesu, Hamamatsu (JP); Tomonori Nakamura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 160 days.

(21) Appl. No.: 18/579,888

(22) PCT Filed: Mar. 15, 2022

(86) PCT No.: PCT/JP2022/011686
§ 371 (c)(1),
(2) Date: Jan. 17, 2024

(87) PCT Pub. No.: WO2023/002688
PCT Pub. Date: Jan. 26, 2023

(65) Prior Publication Data
US 2024/0361382 A1    Oct. 31, 2024

(30) Foreign Application Priority Data
Jul. 19, 2021 (JP) .................. 2021-118430

(51) Int. Cl.
*G01R 31/311* (2006.01)
*G01R 31/28* (2006.01)

(52) U.S. Cl.
CPC ........ *G01R 31/311* (2013.01); *G01R 31/2879* (2013.01)

(58) Field of Classification Search
CPC .... G01R 1/071; G01R 31/26; G01R 31/2601; G01R 31/2851; G01R 31/308; G01R 31/311
See application file for complete search history.

(56) References Cited

U.S. PATENT DOCUMENTS 5,720,891 A    2/1998    Cook et al.
5,750,981 A    5/1998    Fonash
(Continued)

FOREIGN PATENT DOCUMENTS

JP    H7-140209 A    6/1995
JP    H7-167924 A    7/1995
(Continued)

OTHER PUBLICATIONS

Extended European Search Report issued on Jun. 17, 2025 in corresponding European patent application 22845628.1 (10 pages).
(Continued)

*Primary Examiner* — Tung X Nguyen
(74) *Attorney, Agent, or Firm* — Faegre Drinker Biddle & Reath LLP

(57) ABSTRACT

A semiconductor failure analysis device includes a first analysis unit that emits first irradiation light along a first path set on a first main surface of a semiconductor device, a second analysis unit that emits second irradiation light along a second path set on a second main surface that is a back side of the first main surface, an electric signal acquisition unit that receives an electric signal output from the semiconductor device irradiated with the first irradiation light and the second irradiation light, and a computer that controls the second analysis unit. A size of a first irradiation region is different from a size of a second irradiation region. The computer emits the first irradiation light and the second irradiation light while a state where the entire second
(Continued)

irradiation region overlaps the first irradiation region is maintained.

16 Claims, 17 Drawing Sheets

(56) References Cited

U.S. PATENT DOCUMENTS

| | | |
|---|---|---|
| 2004/0103353 A1 | 5/2004 | Koyama et al. |
| 2005/0122525 A1 | 6/2005 | Borden et al. |
| 2018/0033704 A1 | 2/2018 | Suzuki et al. |
| 2022/0196551 A1* | 6/2022 | Nakamura ............ G01N 21/956 |
| 2023/0061399 A1* | 3/2023 | Ikesu .................... G01R 31/311 |
| 2023/0124033 A1* | 4/2023 | Iwata ................. G01N 21/6428 |
| | | 250/459.1 |

FOREIGN PATENT DOCUMENTS

| | | |
|---|---|---|
| JP | 2002-168798 A | 6/2002 |
| JP | 2004-146428 A | 5/2004 |
| JP | 2007-064975 A | 3/2007 |
| JP | 2014-143348 A | 8/2014 |
| JP | 2014-192444 A | 10/2014 |
| JP | 2019-021778 A | 2/2019 |
| JP | 2022-031283 A | 2/2022 |

OTHER PUBLICATIONS

International Preliminary Report on Patentability mailed Feb. 1, 2024 for PCT/JP2022/011686.

* cited by examiner

*Fig.17*
(a)
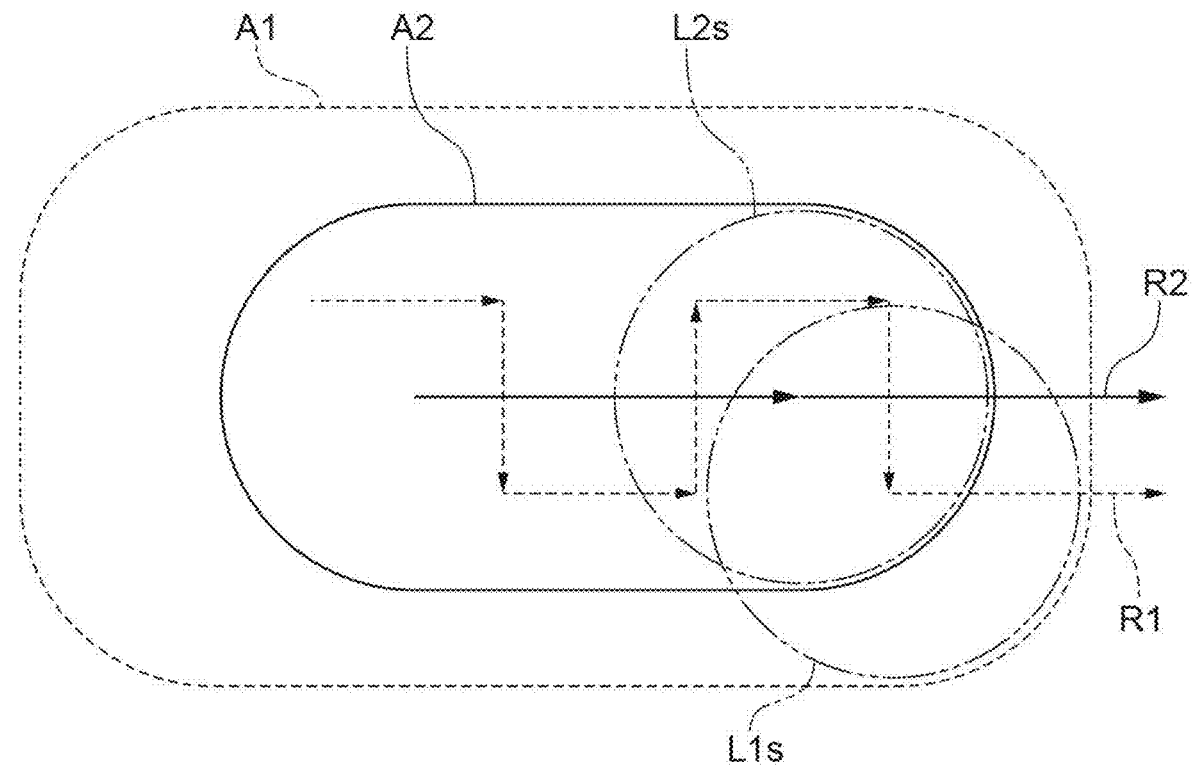
(b)
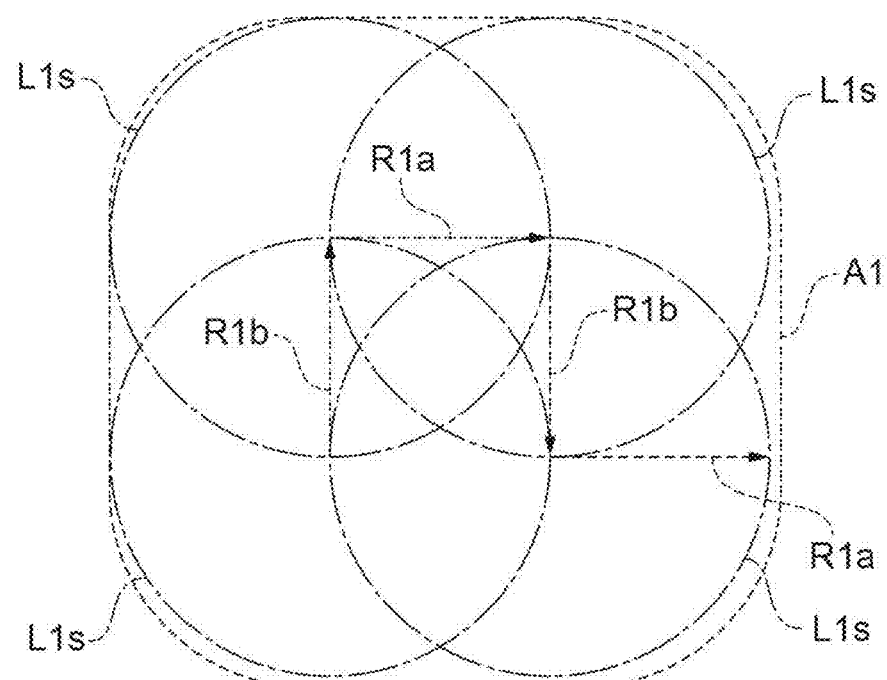

SEMICONDUCTOR FAILURE ANALYSIS DEVICE AND SEMICONDUCTOR FAILURE ANALYSIS METHOD

TECHNICAL FIELD

The present invention relates to a semiconductor failure analysis device and a semiconductor failure analysis method.

BACKGROUND ART

Miniaturization of semiconductor devices is progressing. In order to miniaturize the semiconductor device, it is desired to improve an exposure technique and a patterning technique for manufacturing a semiconductor device. A technique for clarifying whether or not the semiconductor device manufactured by using the exposure technique and patterning technique normally operates is also important. In a case where the semiconductor device does not normally operate, a technique for clarifying a cause of a malfunction is also important.

Patent Literature 1 discloses a device that inspects a wiring formed inside a semiconductor integrated circuit. The inspection device of Patent Literature 1 irradiates a surface of a semiconductor integrated circuit chip that receives a current with a laser beam. Since electron-hole pairs are generated inside a semiconductor due to the irradiation of the laser beam, a current flows through the wiring of the semiconductor integrated circuit. The device of Patent Literature 1 inspects the wiring by using this current.

Patent Literature 2 discloses a technique for testing an integrated circuit microchip by using a so-called laser probing technique. A test device driven by a test electric signal is irradiated with a laser beam. The laser beam is reflected by the test device. The reflected light includes a signal component indicating a response state of the test device to the test electric signal. In the technique of Patent Literature 2, a waveform corresponding to the reflected beam is converted into an electric signal. Then, the electric signal is analyzed.

CITATION LIST

Patent Literature

Patent Literature 1: Japanese Unexamined Patent Publication No. H7-167924
Patent Literature 2: Japanese Unexamined Patent Publication No. 2007-64975

SUMMARY OF INVENTION

Technical Problem

In a technical field of a semiconductor failure analysis device, a technique for satisfactorily detecting a failure portion of a semiconductor device is desired. The present invention provides a semiconductor failure analysis device and a semiconductor failure analysis method that satisfactorily detect a failure portion of a semiconductor device.

Solution to Problem

A semiconductor failure analysis device according to an aspect of the present invention includes a first analysis unit configured to emit first irradiation light along a first path set on a first main surface of a semiconductor device, a second analysis unit configured to emit second irradiation light along a second path set on a second main surface that is a back side of the first main surface, an electric signal acquisition unit configured to receive an electric signal output by the semiconductor device with which the first irradiation light and the second irradiation light are irradiated, and a control unit configured to control at least one of the first analysis unit and the second analysis unit. A size of a first irradiation region formed on the first main surface with the first irradiation light is different from a size of a second irradiation region formed on the second main surface with the second irradiation light. The control unit outputs a control signal for emitting the first irradiation light and the second irradiation light while a state where an entire one region of the first irradiation region and the second irradiation region overlaps the other region of the first irradiation region and the second irradiation region is maintained.

A semiconductor failure analysis method for analyzing a semiconductor device according to another aspect of the present invention includes a setting step of preparing a first irradiation condition for first irradiation light emitted along a first path set on a first main surface of the semiconductor device and a second irradiation condition for second irradiation light emitted along a second path set on a second main surface that is a back side of the first main surface, and an analysis step of acquiring an electric signal output from the semiconductor device while the semiconductor device is irradiated with the first irradiation light and the second irradiation light according to the first irradiation condition and the second irradiation condition set in the setting step. In the setting step, the first irradiation condition and the second irradiation condition are set such that a size of a first irradiation region formed on the first main surface with the first irradiation light is different from a size of a second irradiation region formed on the second main surface with the second irradiation light. In the analysis step, the first irradiation light and the second irradiation light are emitted while a state where an entire one region of the first irradiation region and the second irradiation region overlaps the other region of the first irradiation region and the second irradiation region is maintained.

In the semiconductor failure analysis device and the semiconductor failure analysis method, the first main surface and the second main surface included in the semiconductor device are irradiated with first irradiation light and the second irradiation light, respectively. The size of the first irradiation region is different from the size of the second irradiation region. As a result, the entire smaller irradiation region of the first irradiation region and the second irradiation region can be overlapped with the larger irradiation region. That is, it is possible to scan an inspection surface of the semiconductor device while the size of the first irradiation region and the size of the second irradiation region are set to be different from each other. Accordingly, light stimulus can be reliably applied to the semiconductor device from both sides of the first main surface and the second main surface. As a result, an electric signal affected by the light stimulus is output from the semiconductor device. Accordingly, the failure portion can be reliably visualized. That is, the semiconductor failure analysis device and the semiconductor failure analysis method can satisfactorily detect the failure portion of the semiconductor device.

In the semiconductor failure analysis device, the size of the second irradiation region may be smaller than the size of the first irradiation region. The control unit may output the control signal to the second analysis unit. With this configuration, the entire second irradiation region can be reliably overlapped with the first irradiation region.

The first analysis unit of the semiconductor failure analysis device may include a first optical scanning unit configured to reflect the first irradiation light such that the first irradiation region moves along the first path. The second analysis unit may include a second optical scanning unit configured to reflect the second irradiation light such that the second irradiation region moves along the second path. The control unit may control the first optical scanning unit and the second optical scanning unit by using a ratio based on the size of the first irradiation region and the size of the second irradiation region. Even with these configurations, the entire second irradiation region can be reliably overlapped with the first irradiation region.

The first analysis unit of the semiconductor failure analysis device may include a first light source configured to generate the first irradiation light, and a first optical member configured to guide the first irradiation light from the first light source to the first main surface. The second analysis unit may include a second light source configured to generate the second irradiation light, and a second optical member configured to guide the second irradiation light from the second light source to the second main surface. A difference between the size of the first irradiation region and the size of the second irradiation region may be caused by a difference between an optical characteristic of the first optical member and an optical characteristic of the second optical member. According to these configurations, the difference between the size of the first irradiation region and the size of the second irradiation region can be caused by the selection of the optical member.

The first analysis unit of the semiconductor failure analysis device may include a first lens configured to condense the first irradiation light on the first main surface such that the size of the first irradiation region becomes a predetermined size. The second analysis unit may include a second lens configured to condense the second irradiation light on the second main surface such that the size of the second irradiation region is different from the size of the first irradiation region. A magnification of the first lens may be different from a magnification of the second lens. According to these configurations, the difference between the size of the first irradiation region and the size of the second irradiation region can be caused by the selection of the magnification of the objective lens.

The first analysis unit of the semiconductor failure analysis device may include a first light source configured to generate the first irradiation light, and a first optical member configured to guide the first irradiation light from the first light source to the first main surface. The second analysis unit may include a second light source configured to generate the second irradiation light, and a second optical member configured to guide the second irradiation light from the second light source to the second main surface. A difference between the size of the first irradiation region and the size of the second irradiation region may be caused by a difference between disposition of the first optical member and disposition of the second optical member. According to these configurations, it is possible to cause the difference between the size of the first irradiation region and the size of the second irradiation region depending on the disposition of the optical member.

The first analysis unit of the semiconductor failure analysis device may include a first optical scanning unit configured to reflect the first irradiation light such that the first irradiation region moves along the first path. The second analysis unit may include a second optical scanning unit configured to reflect the second irradiation light such that the second irradiation region moves along the second path. A difference between the size of the first irradiation region and the size of the second irradiation region may be caused by a difference between the first path and the second path. According to these configurations, the difference between the size of the first irradiation region and the size of the second irradiation region can be caused by the difference between the first path and the second path.

A semiconductor failure analysis device according to still another aspect of the present invention includes a first analysis unit configured to emit first irradiation light along a first path set on a first main surface of a semiconductor device, a second analysis unit configured to emit second irradiation light along a second path set on a second main surface that is a back side of the first main surface, a first light detection unit configured to receive first response light from the semiconductor device, which is generated in accordance with the first irradiation light, a second light detection unit configured to receive second response light from the semiconductor device, which is generated in accordance with the second irradiation light, and a control unit configured to control at least one of the first analysis unit and the second analysis unit. A size of a first irradiation region formed on the first main surface with the first irradiation light is different from a size of a second irradiation region formed on the second main surface with the second irradiation light. The control unit outputs a control signal for emitting the first irradiation light and the second irradiation light while a state where an entire one region of the first irradiation region and the second irradiation region overlaps the other region of the first irradiation region and the second irradiation region is maintained.

A semiconductor failure analysis method for analyzing a semiconductor device according to still another aspect of the present invention includes a setting step of preparing a first irradiation condition for first irradiation light emitted along a first path set on a first main surface of the semiconductor device and a second irradiation condition for second irradiation light emitted along a second path set on a second main surface that is a back side of the first main surface, and an analysis step of acquiring first response light from the semiconductor device while the semiconductor device is irradiated with the first irradiation light according to the first irradiation condition set in the setting step and acquiring second response light from the semiconductor device while the semiconductor device is irradiated with the second irradiation light according to the second irradiation condition set in the setting step. In the setting step, the first irradiation condition and the second irradiation condition are set such that a size of a first irradiation region formed on the first main surface with the first irradiation light is different from a size of a second irradiation region formed on the second main surface with the second irradiation light. In the analysis step, the first irradiation light and the second irradiation light are emitted while a state where an entire one region of the first irradiation region and the second irradiation region overlaps the other region of the first irradiation region and the second irradiation region is maintained.

In the semiconductor failure analysis device and the semiconductor failure analysis method, the first main surface and the second main surface included in the semiconductor device are irradiated with the first irradiation light and the second irradiation light, respectively. Since the size of the first irradiation region is different from the size of the second irradiation region, the entire smaller irradiation region of the first irradiation region and the second irradiation region can be overlapped with the larger irradiation region. As a result, the light stimulus can be reliably applied to the semiconductor device from both sides of the first main surface and the second main surface. Accordingly, since it is possible to obtain the first response light and the second response light affected by the light stimulus, it is possible to reliably visualize the failure portion. That is, the semiconductor failure analysis device and the semiconductor failure analysis method can satisfactorily detect the failure portion of the semiconductor device.

Advantageous Effects of Invention

According to the present invention, a semiconductor failure analysis device and a semiconductor failure analysis method for satisfactorily detecting a failure portion of a semiconductor device are provided.

BRIEF DESCRIPTION OF DRAWINGS

FIG. 4(a) is a diagram illustrating a first main surface of the laser-marked semiconductor device. FIG. 4(b) is a diagram illustrating a second main surface of the laser-marked semiconductor device. FIG. 4(c) is a cross-sectional view taken along line II(c)-II(c) in FIG. 4(b).

FIGS. 17(a) and 17(b) are diagrams for describing a first path and a second path in a failure analysis device of Modification 8.

DESCRIPTION OF EMBODIMENTS

Figure 1:
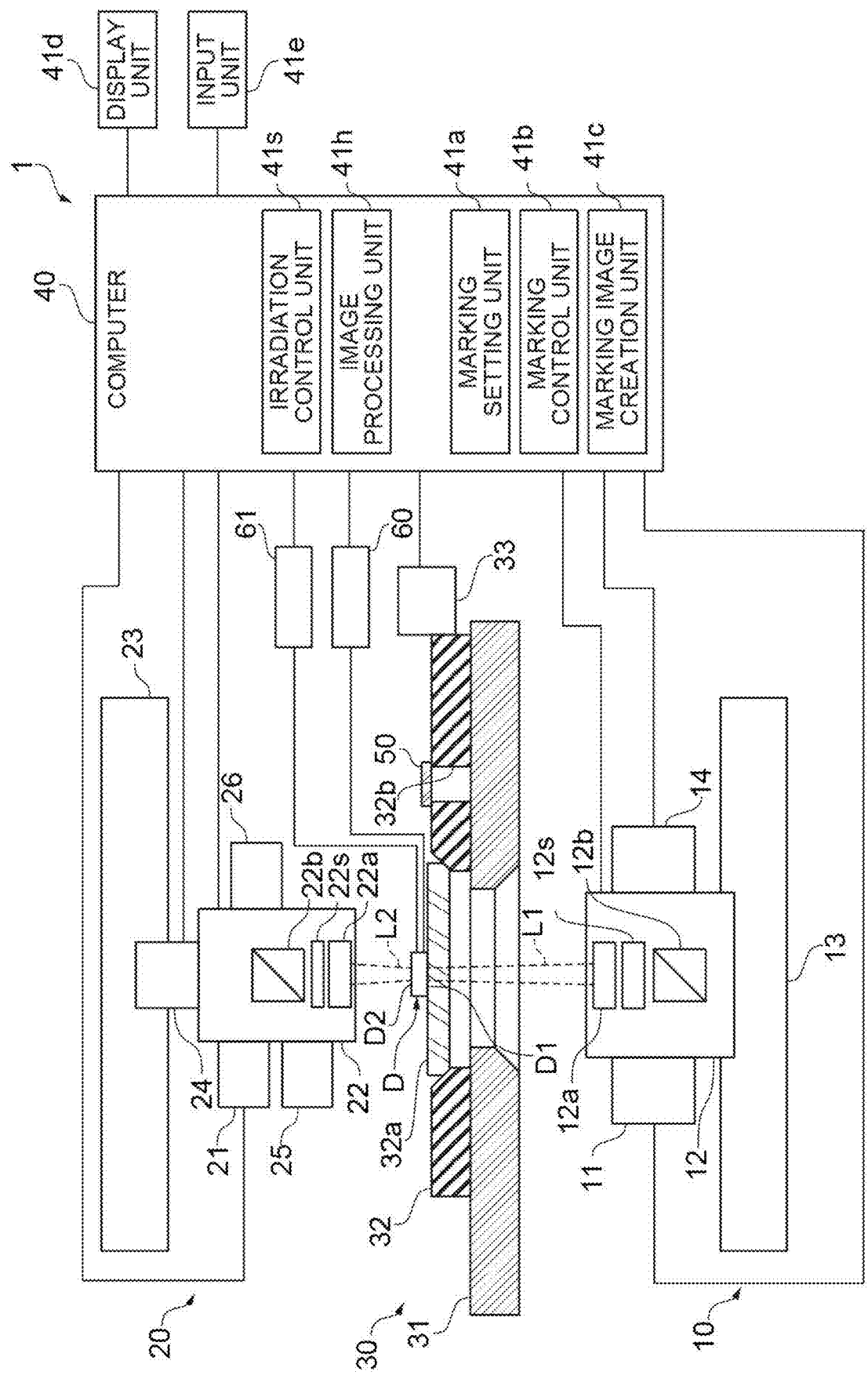
FIG. 1 is a configuration diagram of a semiconductor failure analysis device of a first embodiment.

As illustrated in FIG. 1, a semiconductor failure analysis device of a first embodiment analyzes a semiconductor device D which is a device under test (DUT). The semiconductor failure analysis device may be, for example, an inverted emission microscope. In the following description, the semiconductor failure analysis device of to the first embodiment is simply referred to as an "analysis device 1". The analysis of the semiconductor device D includes, for example, specification of a position of a failure portion included in the semiconductor device D. The analysis of the semiconductor device D is not limited to the specification of the position of the failure portion. The analysis of the semiconductor device D includes another analysis and inspection related to the semiconductor device D. Hereinafter, a description will be given on the assumption that the analysis device 1 of the present embodiment specifies the position of the failure portion included in the semiconductor device D.

In addition to a function of specifying the position of the failure portion, the analysis device 1 may additionally have a function of adding a mark indicating the failure portion to a portion near the failure portion. This marking operation is referred to as "marking". The mark is used to easily grasp a failure portion specified by the analysis device 1 in a step performed after failure analysis.

The semiconductor device D is an integrated circuit (IC) having a PN junction such as a transistor, a logic device which is a large scale integration (LSI), a memory device, and an analog device. The semiconductor device D may be a mixed signal device combining the above devices. The semiconductor device D may be a power semiconductor device (power device) such as a large-current MOS transistor, a high-voltage MOS transistor, a bipolar transistor, or an IGBT. The semiconductor device D has a stacked structure including a substrate and a metal layer. For example, a silicon substrate is used as the substrate of the semiconductor device D.

The analysis device 1 obtains an electric signal image in order to specify the failure portion. There are several types of electric signal images acquired by the analysis device 1. Examples of the electric signal image acquired by the analysis device 1 include an optical beam induced current (OBIC) image which is a photovoltaic current image, an optical beam induced resistance change (OBIRCH) image which is an electrical quantity change image, a soft defect localization (SDL) image which is a correct and incorrect information image, and a laser assisted device alteration (LADA) image.

The OBIC image is based on a photovoltaic current generated by irradiation of light. The OBIC image is obtained by imaging a current value or a current change value of the photovoltaic current as an electric signal characteristic value.

When the semiconductor device D is irradiated with light such as a laser, heat is generated at a position irradiated with the light. Due to the change in temperature caused by the generation of heat, a resistance value changes in wiring and contact constituting the semiconductor device D, a channel of the transistor, the failure portion, and the like. The OBIRCH image is based on a change in resistance value caused by heat. More specifically, the change in the resistance value caused by heat depends on a temperature, a temperature change quantity, an original resistance value, and the like. The change in the resistance value caused by heat can be obtained as a change in a voltage value or a current value. Accordingly, the OBIRCH image is an image of the electric signal characteristic value indicating the change in the voltage value or the change in the current value. For example, in a case where the semiconductor device D receiving a constant voltage is irradiated with light, the change in the resistance value due to the irradiation of light can be obtained as the change in the current value. In a case where the failure portion has a large resistance value, a remarkable electric signal characteristic value can be obtained from the failure portion.

The SDL image is based on information about a malfunction state (for example, PASS/FAIL signal). The semiconductor device D to which a stimulus signal such as a test pattern is applied is irradiated with light. This light does not excite carriers such as charges. When the semiconductor device D is irradiated with light, heat is generated at a position irradiated with light. The generated malfunction state can be detected by the application of the stimulus signal and the heat generation caused by the irradiation of light. As a result, the SDL image can be obtained based on information on the irradiation position and information on the malfunction. The information on the malfunction can be acquired as a luminance value. The SDL image is an image based on the luminance value.

The LADA image is also based on information about the malfunction state (for example, PASS/FAIL signal). Light in a case where the LADA image is obtained excites carriers such as charges. An operation of obtaining the LADA image is different from an operation of obtaining the SDL image in that light for exciting the carriers is emitted. Similarly to the SDL image, the information on the malfunction is acquired as the luminance value based on the application of the stimulus signal and the information on the irradiation position of light, and image data is generated based on the luminance value and the irradiation position of light.

The analysis device 1 includes a first analysis unit 10, a second analysis unit 20, a device disposition unit 30, a computer 40, and an electric signal acquisition unit 61. The first analysis unit 10 is disposed below the semiconductor device D. A first main surface D1 of the semiconductor device D is irradiated with first irradiation light L1 emitted by the first analysis unit 10. The second analysis unit 20 is disposed above the semiconductor device D. A second main surface D2 of the semiconductor device D is irradiated with second irradiation light L2 emitted by the second analysis unit 20. The analysis device 1 specifies the failure portion of the semiconductor device D by using an electric signal output from the semiconductor device D when the first irradiation light L1 and the second irradiation light L2 are emitted.

The first analysis unit 10 includes a component for specifying the failure portion. Specifically, the first analysis unit 10 includes a first irradiation light source 11 (first light source), a first optical system 12, a first XYZ stage 13, and a first camera 14 (first light detection unit).

The first irradiation light source 11 generates first irradiation light L1 for irradiating the semiconductor device D. Details of the first irradiation light source 11 are determined in accordance with an analysis method. For example, in the analysis of irradiating the semiconductor device D with coherent light such as a laser, a solid-state laser source, a semiconductor laser source, or the like may be adopted as the first irradiation light source 11. In the analysis of acquiring the OBIRCH image or the SDL image, the first irradiation light source 11 outputs a laser in a wavelength band in which the semiconductor device D does not generate charges (carriers). For example, in the analysis of the semiconductor device D made of silicon, the first irradiation light source 11 outputs a laser in a wavelength band larger than 1200 nm. The first irradiation light source 11 outputs a laser in a wavelength band of about 1300 nm. In the analysis of acquiring the OBIC image or the LADA image, the first irradiation light source 11 outputs light in a wavelength band in which the semiconductor device D generates charges (carriers). In the analysis of acquiring the OBIC image or the LADA image, the first irradiation light source 11 outputs light in a wavelength band of 1200 nm or less. For example, the first irradiation light source 11 outputs a laser in a wavelength band of about 1064 nm. In the analysis of irradiating the semiconductor device D with incoherent light, a super luminescent diode (SLD), amplified spontaneous emission (ASE), a light emitting diode (LED), or the like may be adopted as the first irradiation light source 11.

Figure 2:
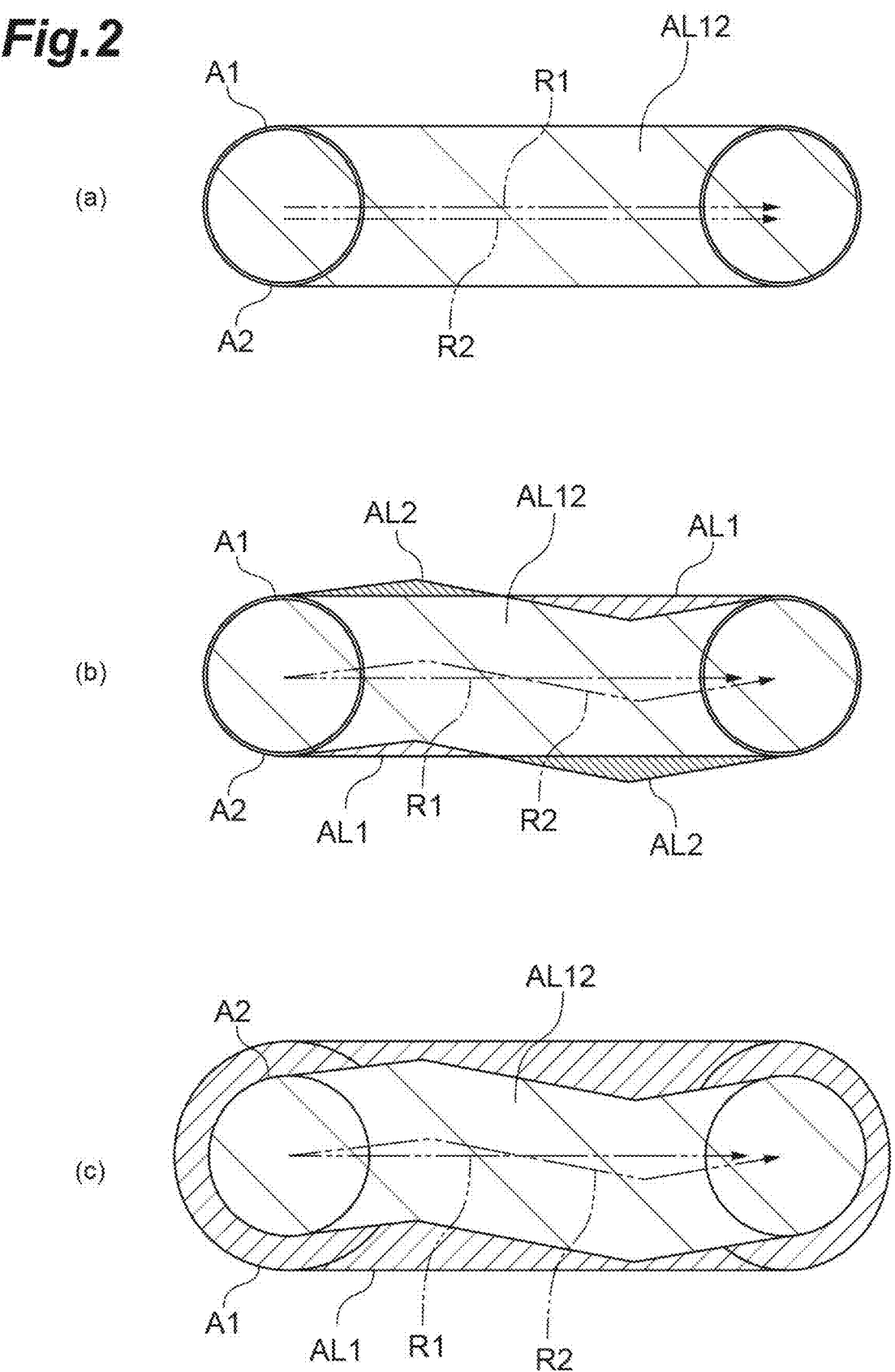
FIGS. 2(a), 2(b), and 2(c) are conceptual diagrams for describing overlapping of a first irradiation region and a second irradiation region.

The first optical system 12 receives the first irradiation light L1 emitted from the first irradiation light source 11 via an optical coupler and an optical fiber. The first optical system 12 includes first optical scanning unit 12s, first objective lens 12a (first optical member or first lens), and a first beam splitter 12b. The first optical scanning unit 12s irradiates the first main surface D1 which is a back surface of the semiconductor device D with the first irradiation light L1 along a predetermined first path R1 (see FIG. 2). The first optical scanning unit 12s is, for example, an optical scanning element such as a galvanometer mirror or a MEMS mirror. The first optical scanning unit 12s is controlled based on a control signal provided from an outside. Examples of the device that provides the control signal include the computer 40, the second analysis unit 20, a pulse generator, a tester, and the like. The first objective lens 12a condenses the first irradiation light L1 received from the first optical scanning unit 12s on the first main surface D1.

The first optical system 12 is placed on the first XYZ stage 13. The first XYZ stage 13 moves the first optical system 12 in a Z-axis direction which is an optical axis direction of the first objective lens 12a. Further, the first XYZ stage 13 also moves the first optical system 12 in an X-axis direction and a Y-axis direction orthogonal to the Z-axis direction. The first XYZ stage 13 is controlled by the computer 40. An observation area is determined by a position of the first XYZ stage 13.

The first camera 14 images the first main surface D1. The first camera 14 outputs image data obtained by imaging to the computer 40. The first camera 14 is, for example, a photodiode, an avalanche photodiode, a photomultiplier tube, or an area image sensor.

The second analysis unit 20 has a component for specifying the failure portion. Specifically, the second analysis unit 20 includes a second irradiation light source 21 (second light source), a second optical system 22, a second camera 24 (second light detection unit), and a second XYZ stage 23. The second irradiation light source 21 has a configuration similar to the first irradiation light source 11. The second optical system 22 includes a second optical scanning unit 22s, a second objective lens 22a (second optical member or second lens), and a second beam splitter 22b. The second optical scanning unit 22s has a configuration similar to the first optical scanning unit 12s. The second camera 24 has a configuration similar to the first camera 14.

Incidentally, when the analysis device 1 performs an operation of specifying the failure portion, the first optical system 12 irradiates the first main surface D1 of the semiconductor device D with the first irradiation light L1. The second optical system 22 irradiates the second main surface D2 of the semiconductor device D with the second irradiation light L2. The irradiation of the first irradiation light L1 and the irradiation of the second irradiation light L2 are temporally parallel.

As illustrated in FIG. 2(a), the first irradiation light L1 forms a first irradiation region A1. The first optical system 12 emits the first irradiation light L1 such that the first irradiation region A1 moves along a preset first path R1. The second irradiation light L2 forms a second irradiation region A2. Similarly, the second optical system 22 emits the second irradiation light L2 such that the second irradiation region A2 moves along a preset second path R2.

For example, when the semiconductor device D is viewed from a direction of an optical axis of the first optical system 12, the first irradiation region A1 overlaps with the second irradiation region A2. The semiconductor device D receives energy by the first irradiation light L1 emitted from the first main surface D1 side and the second irradiation light L2 emitted from the second main surface D2 side. As a result, a portion that has received an input of energy from both surfaces of the first main surface D1 and the second main surface D2 changes a state for specifying the failure portion. For example, in the case of OBIRCH analysis in which the change in the resistance value caused by heat generation is captured, a portion irradiated with the first irradiation light L1 from the first main surface D1 and irradiated with the second irradiation light L2 from the second main surface D2 generates a predetermined amount of heat generation. As a result, in a case where there is the failure portion in the portion irradiated with the first irradiation light L1 and the second irradiation light L2, a state of the failure can be visualized.

Incidentally, as illustrated in FIG. 2(a), positions irradiated with the first irradiation light L1 and the second irradiation light L2 (that is, first irradiation region A1 and second irradiation region A2) move with the lapse of time. The first irradiation region A1 moves along the first path R1. The second irradiation region A2 moves along the second path R2. The movement of the first irradiation light L1 is realized by the first optical scanning unit 12s. The movement of the irradiation position of the second irradiation light L2 is realized by the second optical scanning unit 22s.

As illustrated in FIG. 2(a), in an ideal operation, a region actually irradiated with the first irradiation light L1 and a region actually irradiated with the second irradiation light L2 completely overlap each other, and thus, an overlapping region AL12 is formed. However, the ideal operation illustrated in FIG. 2(a) may not be achieved due to various factors. FIG. 2(b) illustrates a case where the first irradiation light L1 ideally operates along the first path R1, but the second irradiation light L2 operates while deviating from the second path R2. In this case, the region actually irradiated with the first irradiation light L1 and the region actually irradiated with the second irradiation light L2 may not completely overlap each other. Specifically, a first non-overlapping region AL1 irradiated with only the first irradiation light L1, a second non-overlapping region AL2 irradiated with only the second irradiation light L2, and the overlapping region AL12 irradiated with the first irradiation light L1 and the second irradiation light L2 are generated.

As described above, it is necessary to emit the first irradiation light L1 and the second irradiation light L2 in order to visualize the failure portion of the semiconductor device D. The first non-overlapping region AL1 irradiated with only the first irradiation light L1 is not sufficiently stimulated by light. As a result, even in a case where there is the failure portion in the first non-overlapping region AL1, there is a possibility that the failure portion is not visualized. Similarly, the second non-overlapping region AL2 irradiated with only the second irradiation light L2 is not sufficiently stimulated by light. As a result, even in a case where there is the failure portion in the second non-overlapping region AL2, there is a possibility that the failure portion is not visualized. As a result, the region (overlapping region AL12) where the failure portion of the semiconductor device can be satisfactorily detected is narrowed. That is, when the position of the actually irradiated first irradiation light L1 deviates from the set first path R1, the region (overlapping region AL12) where the failure portion of the semiconductor device D can be satisfactorily detected decreases. Similarly, when the position of the actually irradiated second irradiation light L2 deviates from the set second path R2, the region (overlapping region AL12) where the failure portion of the semiconductor device D can be satisfactorily detected decreases.

In view of the above problem, the analysis device 1 of the first embodiment suppresses the decrease in the overlapping region AL12 that reliably visualizes the failure portion. As a result, the analysis device 1 of the first embodiment satisfactorily detects the failure portion of the semiconductor device D.

Specifically, as illustrated in FIG. 2(c), in a state where the scanning of the first irradiation light L1 is stopped, when the first main surface D1 is irradiated with the first irradiation light L1, a circular first irradiation region A1 is generated. In a state where the scanning of the second irradiation light L2 is stopped, when the second main surface D2 is irradiated with the second irradiation light L2, a circular second irradiation region A2 is generated. A size of the first irradiation region A1 is different from a size of the second irradiation region A2.

The "sizes" herein may be defined as an area of the first irradiation region A1 and an area of the second irradiation region A2. In a case where shapes of the first irradiation region A1 and the second irradiation region A2 are circles, the "sizes" may be defined as diameters of the first irradiation region A1 and the second irradiation region A2. The diameters of the first irradiation region A1 and the second irradiation region A2 are so-called spot diameters.

The size of the first irradiation region A1 does not coincide with the size of the second irradiation region A2. More specifically, the size of the second irradiation region A2 is smaller than the size of the first irradiation region A1. In a case where the first irradiation region A1 and the second irradiation region A2 are viewed from a direction of an optical axis of the first analysis unit 10, the entire second irradiation region A2 overlaps the first irradiation region A1.

Figure 3:
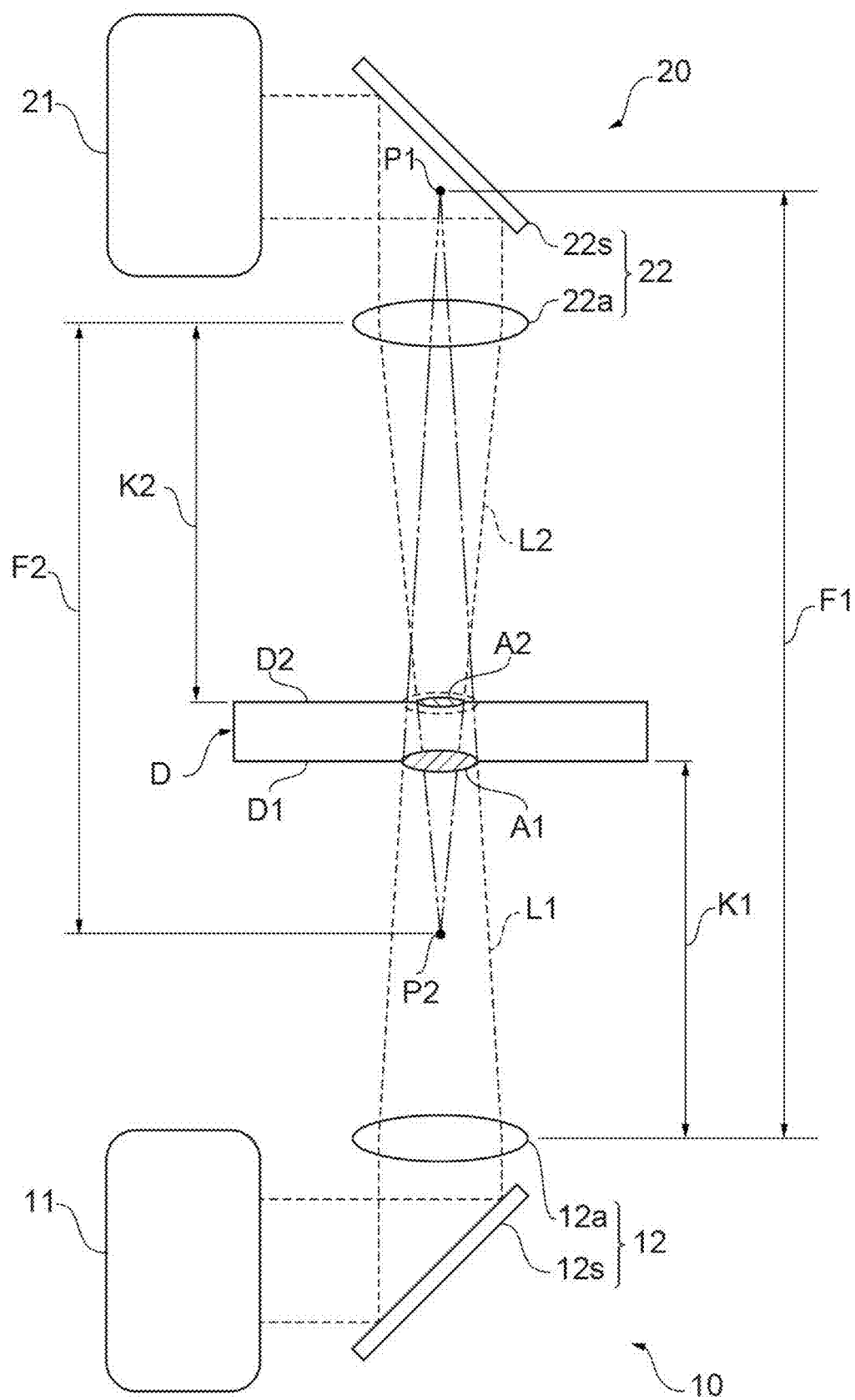
FIG. 3 is a diagram for describing a configuration in which a size of the first irradiation region and a size of the second irradiation region are different from each other.

As illustrated in FIG. 3, a relationship between the first irradiation region A1 and the second irradiation region A2 is caused by the fact that a magnification of the second objective lens 22a included in the second analysis unit 20 is higher than the first objective lens 12a included in the first analysis unit 10. In other words, a difference between the size of the first irradiation region A1 and the size of the second irradiation region A2 is realized by a difference in optical characteristics between the first objective lens 12a and the second objective lens 22a.

The second objective lens 22a included in the second analysis unit 20 has optical characteristics different from the first objective lens 12a included in the first analysis unit 10. The magnification of the second objective lens 22a is different from the magnification of the first objective lens 12a. The magnification of the second objective lens 22a does not coincide with the magnification of the first objective lens 12a. The magnification of the second objective lens 22a is higher than the magnification of the first objective lens 12a.

A difference in the magnification may be rephrased as a difference in focal point. A distance K1 from the first objective lens 12a to the first main surface D1 and a distance K2 from the second objective lens 22a to the second main surface D2 are equal to each other. A second focal point F2 of the second objective lens 22a is shorter than a first focal point F1 of the first objective lens 12a. The first main surface D1 is positioned closer to the first objective lens 12a than a first focal point P1. The second main surface D2 is positioned closer to the second objective lens 22a than a second focal point P2. As a result, the size of the second irradiation region A2 becomes smaller than the size of the first irradiation region A1.

The size of the first irradiation region A1 and the size of the second irradiation region A2 may be different from each other. In the above description, a case where the first irradiation region A1 is smaller than the second irradiation region A2 has been exemplified. For example, the second irradiation region A2 may be larger than the first irradiation region A1.

An effect of suppressing the decrease in the region where the failure portion is visualized occurs when the size of the first irradiation region A1 and the size of the second irradiation region A2 are different from each other. The configuration in which the size of the first irradiation region A1 is different from the size of the second irradiation region A2 does not need to be the difference between the magnification of the first objective lens 12a and the magnification of the second objective lens 22a. Another configuration in which the size of the first irradiation region A1 is different from the size of the second irradiation region A2 will be described later as Modifications 1 to 8.

<Device Disposition Unit>

The description is made with reference to FIG. 1. The device disposition unit 30 holds the semiconductor device D. The device disposition unit 30 changes the position of the semiconductor device D with respect to the first analysis unit 10. The device disposition unit 30 changes the position of the semiconductor device D with respect to the second analysis unit 20. The device disposition unit 30 includes a sample stage 31, a wafer chuck 32, and an XY drive unit 33.

The analysis device 1 includes the first XYZ stage 13 of the first analysis unit 10, the second XYZ stage 23 of the second analysis unit 20, and the XY drive unit 33 of the device disposition unit 30. The analysis device 1 has three drive mechanisms. The analysis device 1 has three degrees of freedom. According to the configuration having three degrees of freedom, for example, the second analysis unit 20 and the device disposition unit 30 can be moved in a state where the first analysis unit 10 is fixed. The device disposition unit 30 can be moved in a state where the first analysis unit 10 and the second analysis unit 20 are fixed. "Fixed" means that the position does not change. For example, the "state where the first analysis unit 10 and the second analysis unit 20 are fixed" refers to a state where a relative position of the second analysis unit 20 with respect to the first analysis unit 10 is maintained.

The wafer chuck 32 is placed on the sample stage 31. The wafer chuck 32 is slidable with respect to the sample stage 31. The wafer chuck 32 includes a device holding unit 32a. The device holding unit 32a holds the semiconductor device D. The device holding unit 32a includes a through-hole provided in the wafer chuck 32 and a glass plate physically closing the through-hole.

Figure 6:
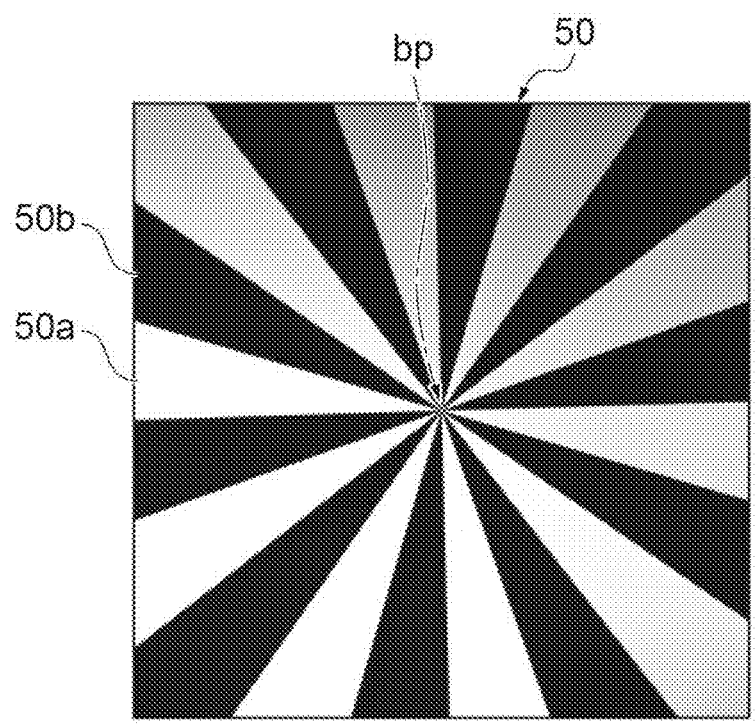
FIG. 6 is a diagram illustrating a target in plan view.

The wafer chuck 32 includes an alignment target 50. The alignment target 50 (see FIG. 6) is a glass plate. A pattern radially extending around a reference point bp is provided on a first surface of the glass plate. This pattern is, for example, a metal film. As an example, the pattern is made of a thin film of aluminum. Accordingly, the pattern constitutes an opaque portion 50b. The glass plate transmits light having a wavelength transmitted through a substrate SiE of the semiconductor device D. Accordingly, a region where the pattern is not provided constitutes a light transmission portion 50a. The wafer chuck 32 has a target hole 32b. The alignment target 50 is disposed in the target hole 32b. The alignment target 50 is disposed to close the target hole 32b. According to the disposition of the alignment target 50, the first camera 14 and the second camera 24 can acquire an image of a pattern provided on one surface of the glass plate.

The alignment target 50 is provided in the wafer chuck 32. In the wafer chuck 32, a position where the device holding unit 32a is provided is different from a position where the alignment target 50 is provided. In a case where the position of the wafer chuck 32 is changed by the XY drive unit 33, the position of the semiconductor device D and the position of the alignment target 50 are simultaneously changed. The position of the alignment target 50 with respect to the semiconductor device D attached to the wafer chuck 32 is unchanged.

The XY drive unit 33 moves the wafer chuck 32 in the X-axis direction or the Y-axis direction in response to a control command from the computer 40. As a result, the observation area can be changed without moving the first analysis unit 10 and the second analysis unit 20.

A specific configuration of the device disposition unit 30 is not limited to the above configuration. The device disposition unit 30 may adopt a configuration capable of exhibiting a function of holding the semiconductor device D and a function of moving the semiconductor device D in at least one of the X-axis direction and the Y-axis direction. For example, an XY stage may be provided instead of the sample stage 31 and the XY drive unit 33. The XY stage moves the wafer chuck 32 in at least one of the X-axis direction and the Y-axis direction.

The analysis device 1 may include a stimulus signal application unit 60 and a marking light source 26 as necessary.

The stimulus signal application unit 60 is electrically connected to the semiconductor device D via a cable. The stimulus signal application unit 60 applies a stimulus signal to the semiconductor device D. The stimulus signal application unit 60 operates by the power received from the power supply. The stimulus signal application unit 60 repeatedly applies a stimulus signal such as a predetermined test pattern to the semiconductor device D. The stimulus signal output from the stimulus signal application unit 60 may be a modulated current signal or a continuous wave (CW) current signal.

The stimulus signal application unit 60 is electrically connected to the computer 40 via a cable. The stimulus signal application unit 60 applies a stimulus signal designated by the computer 40 to the semiconductor device D. The stimulus signal application unit 60 is not necessarily electrically connected to the computer 40. In a case where the stimulus signal application unit 60 is not electrically connected to the computer 40, the stimulus signal application unit alone determines a stimulus signal such as a test pattern. A power supply, a pulse generator, or the like may be used as the stimulus signal application unit 60.

<Marking Light Source>

Figure 4:
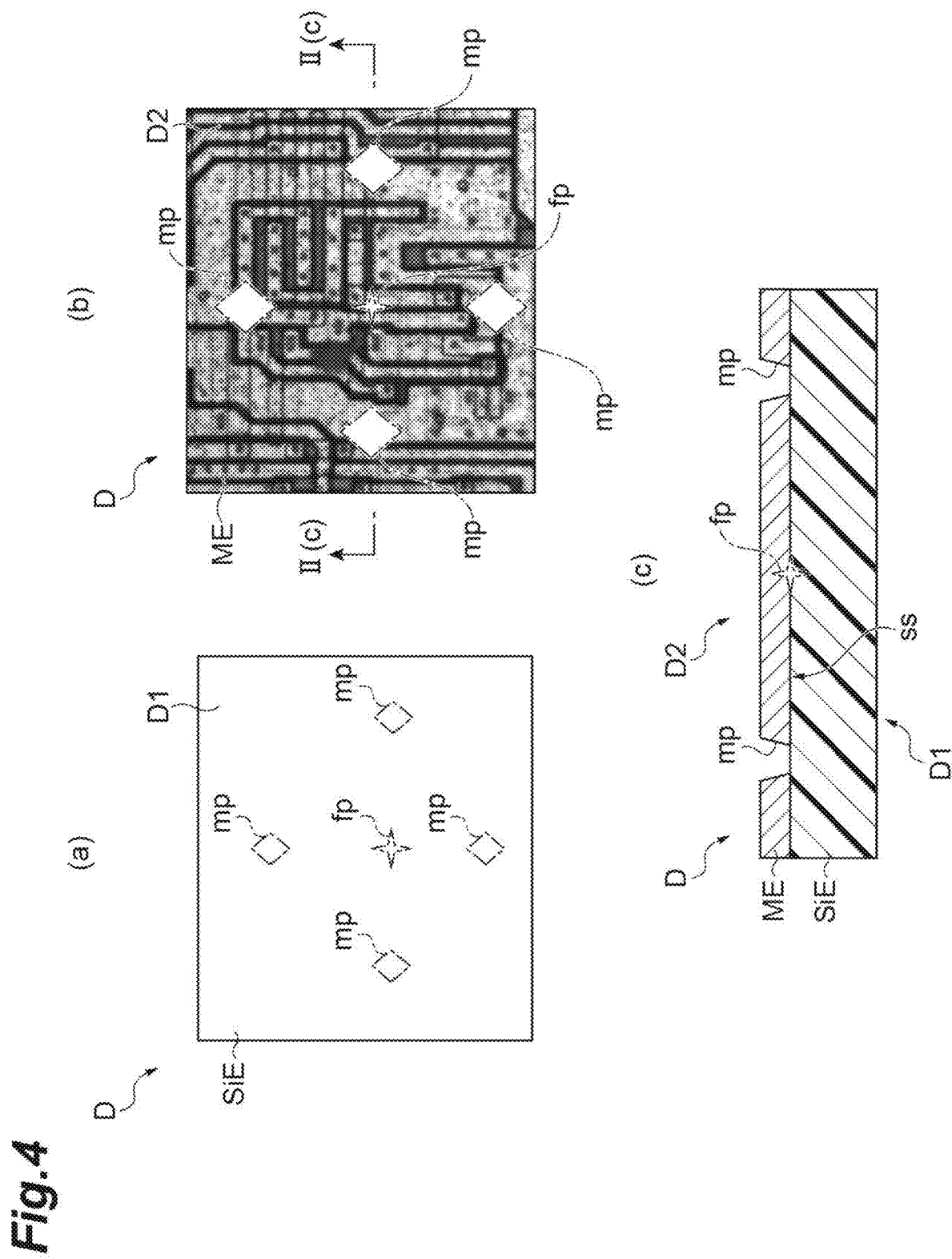
FIG. 4 is a diagram for describing a laser marking image on a semiconductor device.
Figure 5:
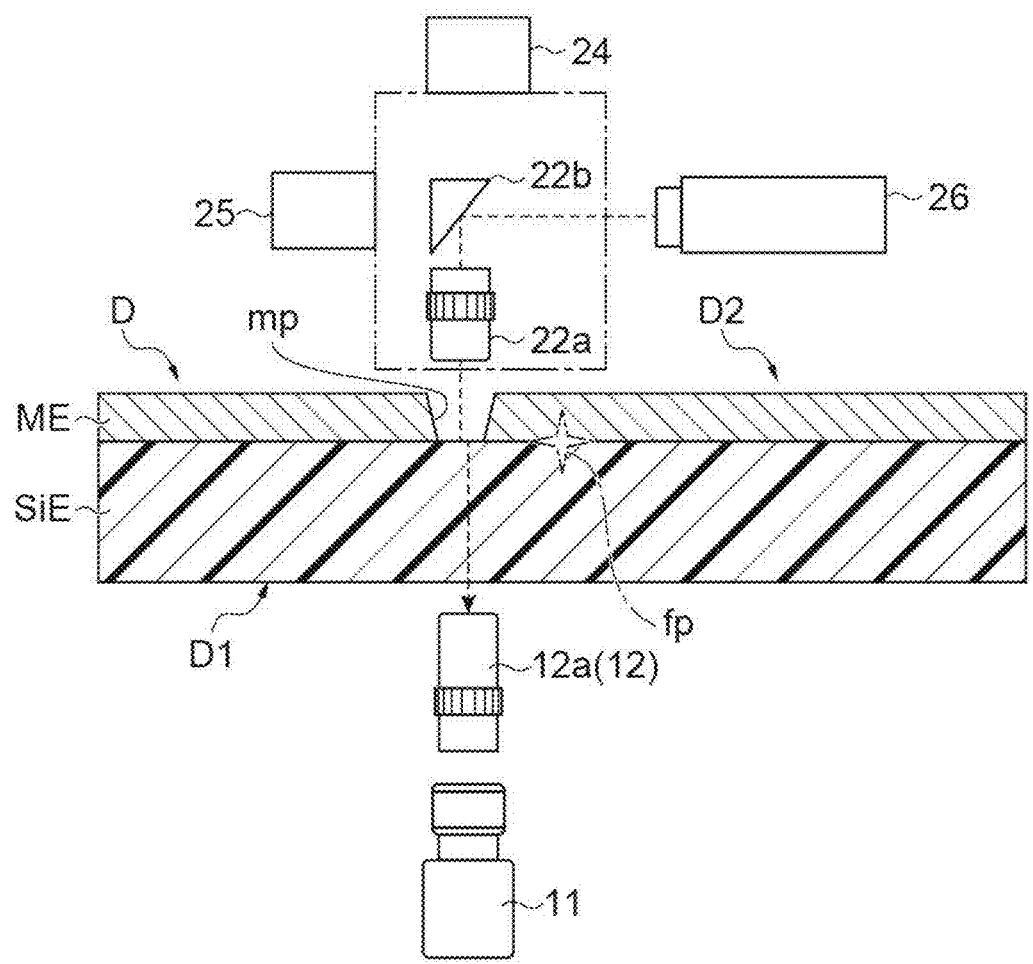
FIG. 5 is a diagram for describing marking control in the analysis device of FIG. 1.

As illustrated in FIGS. 4 and 5, the analysis device 1 may additionally include the marking light source 26 for marking.

The marking light source 26 adds a mark to the portion near the failure portion specified by the computer 40. As illustrated in FIGS. 4(a) and 4(b), a marking portion mp is set to a portion near the failure portion fp. FIGS. 4(a) and 4(b) illustrate four marking portions mp. In a state where the laser marking is completed, as illustrated in FIG. 4(c), a through-hole penetrating a metal layer ME of the semiconductor device D is formed. The laser marking forms a through-hole reaching an interface ss between the metal layer ME and the substrate SiE. As a result, a surface of the substrate SiE in contact with the metal layer ME is exposed. The "mark" used in the present specification may mean the through-hole formed in the metal layer ME. The "mark" used in the present specification may mean the substrate SiE exposed from the through-hole.

The marking light source 26 irradiates the marking portion mp of the semiconductor device D with a marking laser via the second optical system 22. The marking light source 26 irradiates the marking portion mp with a laser from the metal layer ME side of the semiconductor device D. The laser forms the through-hole in the metal layer ME. When a control signal for starting the irradiation of the laser is received from the computer 40, the marking light source 26 starts the irradiation of the laser. For example, a solid-state laser source, a semiconductor laser source, or the like may be adopted as the marking light source 26. A wavelength of light emitted from the marking light source 26 is more than or equal to 250 nm and less than or equal to 2000 nm.

The second optical system 22 guides the laser to the marking portion mp of the semiconductor device D. Specifically, the second optical system 22 irradiates the semiconductor device D with the laser from the metal layer ME side of the semiconductor device D. In other words, the second optical system 22 irradiates the semiconductor device D with a laser from the second main surface D2 side of the semiconductor device D. The second beam splitter 22b of the second optical system 22 switches between optical paths of the marking light source 26 and the second camera 24. The second objective lens 22a condenses the laser on the marking portion mp. The second objective lens 22a and the second beam splitter 22b guide light coming from the surface of the semiconductor device D to the second camera 24.

The second XYZ stage 23 is driven to cause an optical axis of the second objective lens 22a to coincide with the marking position, and thus, the marking position may be irradiated with the laser. The marking position may be irradiated with the laser by the second optical scanning unit 22s. The second optical system 22 may include a shutter. The shutter switches between a state where the laser from the marking light source 26 is allowed to pass and a state where the laser is blocked. As a result, the irradiation and stoppage of the laser can be controlled. These operations follow a control signal output from a marking control unit 41b of the computer 40 to be described later.

The second camera 24 images the metal layer ME of the semiconductor device D from the second main surface D2 side of the semiconductor device D. The second camera 24 outputs the imaged image to the computer 40. A user can grasp a situation of the laser marking viewed from the second main surface D2 side of the semiconductor device D by confirming the imaged image. An illumination light source 25 illuminates the semiconductor device D with illumination light when the image is imaged by the second camera 24.

<Computer>

The description is made with reference to FIG. 1. The computer 40 is a computer such as a personal computer. The computer 40 physically includes a memory such as a RAM and a ROM, a processor (arithmetic circuit) such as a CPU, a communication interface, and a storage unit such as a hard disk. Examples of the computer 40 include a personal computer, a cloud server, and a smart device (smartphone, tablet terminal, or the like). The computer 40 functions by executing a program stored in a memory by a CPU of a computer system.

The computer 40 includes an irradiation control unit 41s and an image processing unit 41h, as elements for a function of specifying the failure portion. The irradiation control unit 41s outputs a control signal to the second analysis unit 20. The second analysis unit 20 that has received the control signal irradiates the semiconductor device D with the second irradiation light L2. The first analysis unit 10 does not receive a control signal for the first irradiation light L1 from the computer 40. The first analysis unit 10 receives a control signal for the first irradiation light L1 from the second analysis unit 20. An operation of synchronizing the first irradiation light L1 and the second irradiation light L2 is performed by the second analysis unit 20 that has received the control signal from the computer 40 outputting the control signal to the first analysis unit 10 to follow an operation of the second analysis unit 20. The second irradiation region A2 is smaller than the first irradiation region A1. The computer 40 outputs a control signal to the second analysis unit 20 forming the smaller second irradiation region A2.

The control signal controls irradiation start and irradiation stoppage of the second irradiation light L2. The control signal controls the irradiation position of the second irradiation light L2. Specifically, the control signal controls the second optical scanning unit 22s. In a case where the second optical scanning unit 22s is a mirror, the control signal controls an angle of a mirror.

The irradiation control unit 41s may generate the control signal for the second optical scanning unit 22s based on a ratio between the size of the first irradiation region A1 and the size of the second irradiation region A2. For example, in a case where the magnification of the first objective lens 12a that generates the larger first irradiation region A1 is set to "1", the magnification of the second objective lens 22a that generates the second irradiation region A2 is indicated by a value (N) larger than "1". It is assumed that a ratio between the magnification of the first objective lens 12a and the magnification of the second objective lens 22a is indicated as 1:N. In this case, the irradiation control unit 41s performs control such that a swing angle of the mirror constituting the second optical scanning unit 22s becomes N times.

A scan angle is increased in accordance with the ratio of the magnification of the objective lens. As a result, a size of a visual field of the first objective lens 12a and a size of a visual field of the second objective lens 22a can coincide with each other. For example, it is assumed that the magnification of the second objective lens 22a is twice the magnification of the first objective lens 12a. In this case, the size of the visual field of the second objective lens 22a (a length of each side of the visual field) is half the size of the visual field of the first objective lens 12a (a length of each side of the visual field). Accordingly, the swing angle of the mirror that guides light to the second objective lens 22a is set to twice the swing angle of the mirror that guides light to the first objective lens 12a.

The computer 40 may output the control signal to the first analysis unit 10 in parallel with the output of the control signal to the second analysis unit 20.

The image processing unit 41h obtains the electric signal characteristic value output from the electric signal acquisition unit 61. The image processing unit 41 generates the electric signal image based on the electric signal characteristic value. Examples of the electric signal image include the OBIC image, the OBIRCH image, the SDL image, and the LADA image.

In a case where the analysis device 1 has a function of adding marking, the computer 40 may additionally include, as functional components, a marking setting unit 41a, a marking control unit 41b, and a marking image creation unit 41c.

<Marking Setting Unit>

The marking setting unit 41a sets the marking portion mp based on information indicating the failure portion fp input from an input unit 41e. The marking portions mp at several portions are set to portions near the specified failure portion fp. The several portions are, for example, four portions. For example, in a case where the information indicating the failure portion fp is input, the marking setting unit 41a automatically sets the marking portions mp at four portions near the failure portion fp around the failure portion fp. Specifically, the marking setting unit 41a sets the marking portion mp in a cross shape around the failure portion fp in plan view, for example (see FIGS. 4(a) and 4(b)). The marking portion mp may be set by information input from the user. The user inputs information indicating the marking portion mp while viewing an analysis image displayed on a display unit 41d. The information indicating the marking portion mp is received by the input unit 41e. In a case where the user inputs information, the marking setting unit 41a does not automatically set the marking portion mp. The marking setting unit 41a sets the marking portion mp based on the information indicating the marking portion mp input from the input unit 41e. The marking setting unit 41a generates a reference image. The reference image is obtained by adding a mark indicating the failure portion fp and a mark indicating the marking portion mp to the analysis image. The marking setting unit 41a stores the reference image in the memory of the computer 40.

<Marking Control Unit>

The marking control unit 41b controls the second XYZ stage 23 of the second analysis unit 20 such that the observation area of the failure portion falls within the field of view of the second camera 24. The marking control unit 41b controls the second XYZ stage 23 of the marking light source 26 such that the optical axis of the second optical system 22 coincides with the optical axis of the first optical system 12. The marking control unit 41b controls the XY drive unit 33 of the device disposition unit 30 such that the optical axis of the second optical system 22 overlaps the marking portion mp. The marking control unit 41b may control the second optical scanning unit 22s.

The marking control unit 41b also controls the marking light source 26. In a case where the marking image creation unit 41c determines that a mark image appears, the marking control unit 41b outputs an output stoppage signal to the marking light source 26. In a case where the output stoppage signal is input, the marking light source 26 stops the output of the laser. Thus, the marking light source 26 continues to output the laser until the output stoppage signal is input after an output start signal is input by the marking control unit 41b. The marking control unit 41b controls the marking light source 26 such that laser marking is performed until the mark image formed by laser marking appears in a pattern image. A penetration threshold of laser is set. The marking control unit 41b controls the marking light source 26 such that laser marking is performed until the laser penetrates the metal layer ME.

<Marking Image Creation Unit>

The computer 40 is electrically connected to the first camera 14 via a cable. The computer 40 creates a pattern image and a light emission image by using the image data input from the first camera 14. It is difficult to specify a light emission position in the pattern of the semiconductor device D only with the light emission image. The computer 40 generates a superimposed image as the analysis image. The superimposed image includes a pattern image based on reflected light from the semiconductor device D and a light emission image based on light emission from the semiconductor device D. The pattern image and the light emission image are superimposed on each other.

The marking image creation unit 41c creates a marking image. The marking image includes a pattern image including the mark image and the light emission image. The pattern image and the light emission image overlap each other. The created marking image is stored in the memory of the computer 40. The marking image creation unit 41c displays the marking image on the display unit 41d. With the marking image, the user can accurately grasp the marking position with respect to the position of the failure portion in a subsequent step. The marking image creation unit 41c acquires marking information. The marking information is information necessary for grasping the marking position with respect to the position of the failure portion. Examples of the marking information include a distance of a position from the marking position to the failure portion, and an orientation of the marking position with the position of the failure portion as a reference. The acquired marking information may be displayed as a list. The marking information may be displayed in addition to the marking image. The marking information may be output on a paper medium.

The computer 40 outputs the analysis image to the display unit 41d. The display unit 41d is a display device such as a display for showing the analysis image or the like to the user. The user can confirm the position of the failure portion from the analysis image displayed on the display unit 41d. The user inputs the information indicating the failure portion by using the input unit 41e. The input unit 41e is an input device such as a keyboard and a mouse that receives an input from the user. The input unit 41e outputs the information indicating the failure portion to the computer 40. The computer 40, the display unit 41d, and the input unit 41e may be tablet terminals.

The marking image creation unit 41c may cause the marking control unit 41b to output a control command for stopping the irradiation of the laser. The control command to stop the laser irradiation is generated by using the mark image appearing in the pattern image. Specifically, the marking image creation unit 41c sequentially generates pattern images in parallel with the laser marking by the laser output from the marking light source 26. A hole is formed in the metal layer ME of the marking portion mp by the laser marking. When the hole of the metal layer ME is shallow, since an intensity change in the reflected light at the marking position is small, a change in an optical reflected image is also small. In other words, since the hole formed by the laser marking is formed only in the metal layer ME, when the light does not reach the substrate SiE, the intensity change in the reflected light at the marking position is small. Accordingly, the change in the optical reflected image is also small. As a result, the influence of the laser marking does not appear in the pattern image. When the hole of the metal layer ME becomes deep, a change in at least one of a refractive index, a transmittance, and a reflectance of light on the first main surface D1 side increases. Specifically, when the hole becomes deep enough to reach the interface surface ss between the metal layer ME and the substrate SiE, a change in at least one of the refractive index, the transmittance, and the reflectance of light on the first main surface D1 side increases. Due to these changes, the intensity change in the reflected light at the marking position becomes large. As a result, a mark image indicating the marking portion appears in the pattern image.

For example, the marking image creation unit 41c compares the above-described reference image with the pattern image. As a result of the comparison, in a case where a difference between the images is larger than a predetermined specified value, the marking image creation unit 41c determines that the mark image appears. The prescribed value is set in advance, and thus, it is possible to determine a timing at which it is determined that the mark image appears.

The marking image creation unit 41c may determine whether or not the mark image has appeared in accordance with an input content from the user. In a case where it is determined that the mark image appears, the marking image creation unit 41c compares the reference image with the pattern image. In a case where a mark forming portion of the pattern image deviates from the marking portion mp of the reference image, the marking image creation unit 41c may determine that the positional deviation of the mark occurs. In this case, the laser marking may be performed again such that the mark is formed at the correct marking portion mp.

The marking may be accompanied by the following deformation.

For example, it has been described that the laser marking is performed to such an extent that the surface of the substrate SiE in contact with the metal layer ME is exposed by the laser penetrating the metal layer ME. However, this aspect is not limited thereto. A depth of the hole by the laser marking may be any depth as long as the mark image appears in the pattern image. Specifically, for example, the laser marking may be further performed even after the surface of the substrate SiE that penetrates the metal layer ME and is in contact with the metal layer ME is exposed. For example, in a case where a thickness of the metal layer ME is 10 µm and a thickness of the substrate SiE is 500 µm, the hole by the laser marking may be formed deeper than the surface of the substrate SiE in contact with the metal layer ME by about 1 µm. The hole by the laser marking does not necessarily penetrate the metal layer ME. For example, it is assumed that the thickness of the metal layer ME is 10 µm and the thickness of the substrate SiE is 500 µm. In this case, the thickness of the metal layer ME at the portion where the hole by the laser marking is formed may be about 50 nm. The hole by the laser marking may not reach the surface of the substrate SiE in contact with the metal layer ME.

It has been described that the generation of the pattern image is performed while the laser marking is performed. However, this aspect is not limited thereto. For example, the pattern image may be generated when the output of the laser is stopped. In this case, an operation of outputting the laser and an operation of stopping the laser and generating the pattern image may be alternately performed at predetermined intervals.

In a case where the wavelength of the laser output from the marking light source 26 is more than or equal to 1000 nanometers, the first analysis unit 10 may have an optical filter that blocks only the laser having the wavelength of 1000 nanometers or more. In a case where the laser output from the marking light source 26 transmits through the substrate SiE of the semiconductor device D, the laser is shielded by the first analysis unit 10. As a result, destruction of a photodetector by the laser can be suppressed.

The wavelength of the laser output from the marking light source 26 may be less than 1000 nanometers. In this case, for example, in a case where the semiconductor device D includes a substrate such as a silicon substrate, the laser is absorbed by the substrate. As a result, it is possible to suppress the destruction of the photodetector such as the first camera 14 by the laser without providing an optical filter or the like.

The component that applies the stimulus signal to the semiconductor device D is not limited to the stimulus signal application unit 60. A device that applies a voltage or a current to the semiconductor device D may be employed as the stimulus signal application unit that is the component that applies the stimulus signal to the semiconductor device D. The stimulus signal may be applied to the semiconductor device D by using these devices.

Figure 7:
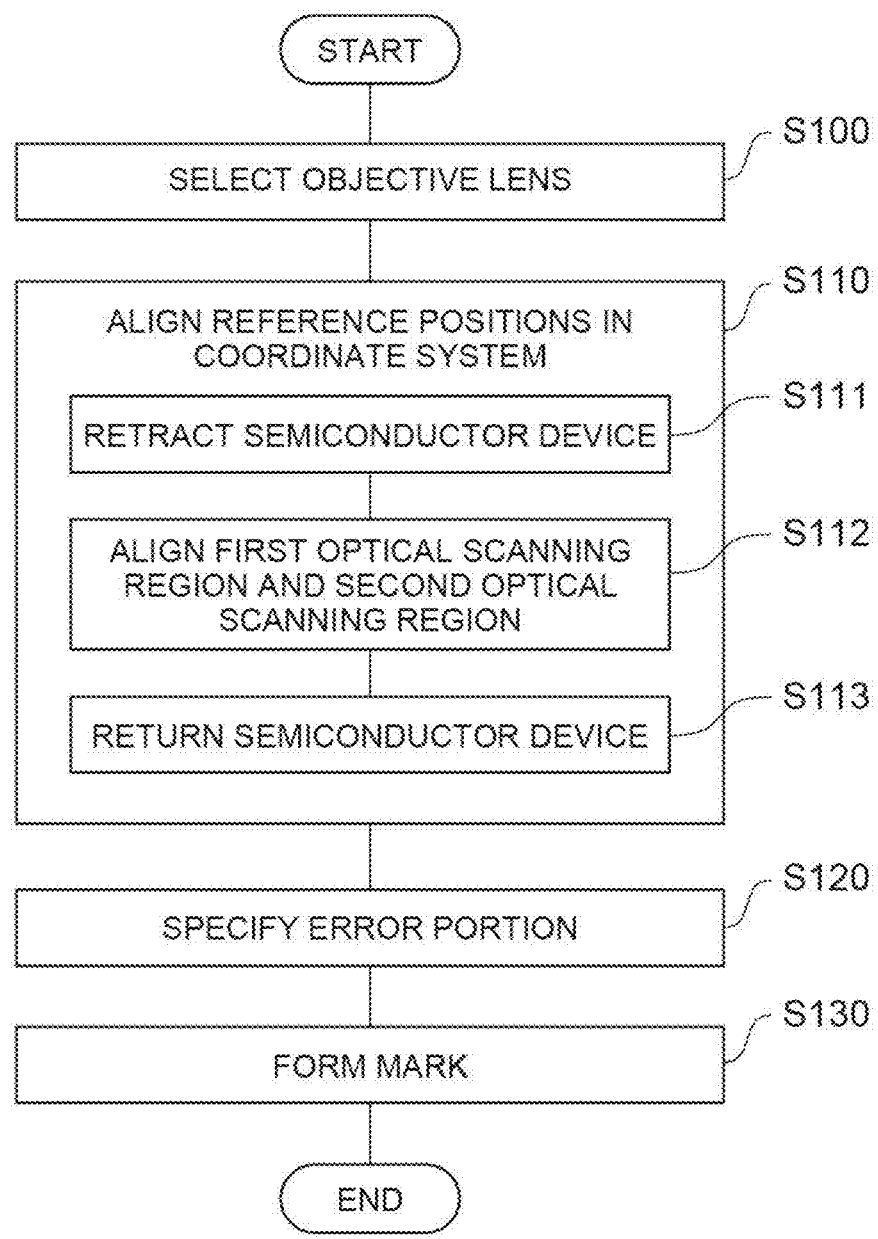
FIG. 7 is a flowchart illustrating main steps of a semiconductor failure analysis method using the analysis device of FIG. 1.

Analysis processing of the analysis device 1 will be described. FIG. 7 is a flowchart illustrating main steps of the analysis processing using the analysis device 1.

<Setting Step S100>

Preparation for setting the size of the first irradiation region A1 and the size of the second irradiation region A2 to be different from each other is performed. In the analysis device 1 of the first embodiment, in order to set the size of the first irradiation region A1 and the size of the second irradiation region A2 to be different from each other, the magnification of the first objective lens 12a and the magnification of the second objective lens 22a are set to be different. In the setting step S100, the magnification of the first objective lens 12a is set to a predetermined magnification, and the magnification of the second objective lens 22a is set to a magnification different from the magnification of the first objective lens 12a. For example, the first analysis unit 10 and the second analysis unit 20 include a plurality of objective lenses having magnifications different from each other. The objective lens used for analysis is selected by an input operation of the user using the input unit 41e. The computer 40 outputs information of the selected objective lens to the first analysis unit 10 and the second analysis unit 20. The first analysis unit 10 disposes, as the first objective lens 12a, the objective lens according to the input information on the optical axis. The second analysis unit 20 disposes, as the second objective lens 22a, the objective lens according to the input information on the optical axis.

<Alignment Step S110>

Next, the first optical system 12 and the second optical system 22 are aligned (S110). "Alignment" means that the optical axis of the second optical system 22 is aligned with the optical axis of the first optical system 12. More specifically, "alignment" means that deviation of a center of a second optical scanning region related to the second optical system 22 from a center of a first optical scanning region related to the first optical system 12. The irradiation control unit 41s outputs an alignment command for step S110. The XY drive unit 33 moves the wafer chuck 32 to capture the alignment target 50 in the visual field of the first optical system 12 (S111). The irradiation control unit 41s stores a movement amount of the semiconductor device D. The movement amount may be a movement amount of the wafer chuck 32.

Subsequently, the first optical scanning region of the first optical system 12 and the second optical scanning region of the second optical system 22 are aligned with each other (S112). The optical axis of the second optical system 22 is aligned with the optical axis of the first optical system 12, and thus, the center of the first optical scanning region related to the first optical system 12 and the center of the second optical scanning region related to the second optical system 22 are aligned. The second XYZ stage 23 moves the second optical system 22 to capture the alignment target 50 in the visual field of the second optical system 22. Subsequently, the illumination light source 25 outputs the illumination light toward the alignment target 50. The illumination light is transmitted through the light transmission portion 50a of the alignment target 50. The first camera 14 of the first optical system 12 obtains a transmitted image by the light transmitted through the light transmission portion 50a of the alignment target 50. The first camera 14 outputs the transmitted image to the computer 40. The second camera 24 obtains a reflected image by the reflected light reflected by the opaque portion 50b of the alignment target 50. The second camera 24 outputs the reflected image to the computer 40. The image processing unit 41h calculates the deviation of the optical axis of the second optical system 22 from the optical axis of the first optical system 12 by using the transmitted image and the reflected image. An operation of moving the second optical system 22 and an operation of confirming a deviation amount are repeated until the deviation falls within an allowable range. When it is determined that the deviation falls within the allowable range, the alignment of the optical axes is completed. As a result, the center of the first optical scanning region related to the first optical system 12 can be aligned with the center of the second optical scanning region related to the second optical system 22. The second optical system 22 may be moved in a state where the position of the first optical system 12 is fixed as an operation for setting the deviation to fall within the allowable range. The first optical system 12 may be moved while the position of the second optical system 22 is fixed. Both the first optical system 12 and the second optical system 22 may be moved.

After the alignment of the optical scanning regions is completed, the XY drive unit 33 moves the wafer chuck 32 to capture the semiconductor device D in the visual fields of the first optical system 12 and the second optical system 22 (S113). At this time, the irradiation control unit 41s may control the XY drive unit 33 based on the movement amount stored when the semiconductor device D is retracted. Relative positions of the first optical system 12, the second optical system 22, and the semiconductor device D may be controlled by using image data output from the first camera 14 and the second camera 24. In this case, the target to be moved is also only the semiconductor device D. Immediately after the alignment of the scanning regions is completed, the semiconductor device D is retracted. That is, the semiconductor device D is not present in the visual fields of the first optical system 12 and the second optical system 22. Therefore, after the alignment of the scanning regions is completed, the semiconductor device D is placed in the visual fields of the first optical system 12 and the second optical system 22. More specifically, the semiconductor device D is disposed in the first optical scanning region of the first optical system 12 and the second optical scanning region of the second optical system 22. The semiconductor device D is moved after the alignment is completed. In other words, after the alignment is completed, the first optical system 12 and the second optical system 22 are not moved. As a result, a relative positional relationship of the second optical scanning region of the second optical system 22 with respect to the first optical scanning region of the first optical system 12 is maintained as the alignment result.

<Analysis Step S120>

Subsequently, the failure portion of the semiconductor device D is specified (S120). Specifically, the computer 40 outputs the control signal to the second analysis unit 20. As a result, the optical scanning by the second analysis unit 20 is started. Along with the operation of the second analysis unit 20, the optical scanning of the first analysis unit 10 is also started. An electrical characteristic signal is acquired from the semiconductor device D. In parallel with the acquisition of the electrical characteristic signal, the pattern image may be acquired by detecting the reflected light from the semiconductor device D. The control signal received by the first analysis unit 10 and the second analysis unit 20 may be input from a pulse generator or a tester. In this case, the control signal is given from the pulse generator or the tester to the first analysis unit 10, and the control signal is also given in parallel to the second analysis unit 20.

In the analysis step S120, a desired electric signal image is obtained in accordance with the characteristics of the first irradiation light L1 and the second irradiation light L2. Further, in the analysis step S120, a desired electric signal image is obtained in accordance with the state of the semiconductor device D receiving the irradiation light. Examples of the electric signal image include the OBIC image, the OBIRCH image, the SDL image, and the LADA image.

Examples of a first analysis operation include an operation of obtaining the OBIC image. In the first analysis, the semiconductor device D is irradiated with the first irradiation light L1 and the second irradiation light L2. In the first analysis, the stimulus signal application unit 60 does not apply the stimulus signal to the semiconductor device D. The semiconductor device D that has received the laser may generate the photovoltaic current. The electric signal acquisition unit 61 outputs, as the electric signal characteristic value, the current value or the current change value of the photovoltaic current.

Examples of a second analysis operation include an operation of obtaining the OBIRCH image. In the second analysis, the semiconductor device D is irradiated with the first irradiation light L1 and the second irradiation light L2. In the second analysis, the stimulus signal application unit 60 applies the constant current that is the stimulus signal to the semiconductor device D. The stimulus signal may be a constant voltage. When the semiconductor device D that has received the stimulus signal is irradiated with the laser, a resistance value of the irradiation position in the semiconductor device D changes. The electric signal acquisition unit 61 outputs, as the electric signal characteristic value, the voltage value or the value of change in voltage corresponding to a change in resistance value.

As a third analysis operation, there is an operation of obtaining the SDL image. In the third analysis, the semiconductor device D is irradiated with the first irradiation light L1 and the second irradiation light L2. In the third analysis, a laser having a wavelength at which carriers are not excited is adopted as the first irradiation light L1 and the second irradiation light L2. In the third analysis operation, the stimulus signal application unit 60 applies the stimulus signal such as the test pattern. When the semiconductor device D that has received the stimulus signal is irradiated with the laser having the wavelength at which carriers are not excited, it is possible to detect the malfunction state of the semiconductor device D. The electric signal acquisition unit 61 outputs, as the electric signal characteristic value, the information related to the malfunction state (for example, PASS/FAIL signal).

Examples of a fourth analysis operation include an operation of obtaining the LADA image. In the fourth analysis, the semiconductor device D is irradiated with the first irradiation light L1 and the second irradiation light L2. In the fourth analysis, a laser having a wavelength at which carriers are excited is adopted as the first irradiation light L1 and the second irradiation light L2. In the fourth analysis operation, the stimulus signal application unit 60 applies the stimulus signal such as the test pattern. When the semiconductor device D that has received the stimulus signal is irradiated with the laser having the wavelength at which the carrier is excited, a malfunction state of the semiconductor device D can be detected. The electric signal acquisition unit 61 outputs, as the electric signal characteristic value, the information related to the malfunction state (for example, PASS/FAIL signal).

<Marking Step S130>

An operation of forming the marking on the marking portion mp (S130) may be performed as necessary. The marking control unit 41b outputs a marking command for step S130 to the marking light source 26 and the device disposition unit 30. Specifically, the marking light source 26 outputs the laser. The laser marking is performed on all the set marking portions mp. In an output operation of the laser to each marking portion mp, the marking image creation unit 41c may determine whether or not the mark image appears in the pattern image. In a case where it is determined that the mark image does not appear in the pattern image, the irradiation of the laser is executed again. In parallel with the irradiation operation of the laser, the marking image creation unit 41c generates the pattern image.

Hereinafter, operations and effects of the analysis device 1 of the present embodiment will be described.

The semiconductor failure analysis device 1 includes the first analysis unit 10 that emits the first irradiation light L1 along the first path R1 set on the first main surface D1 of the semiconductor device D, the second analysis unit 20 that emits the second irradiation light L2 along the second path R2 set on the second main surface D2 that is the back side of the first main surface D1, the electric signal acquisition unit 61 that receives the electric signal output from the semiconductor device D irradiated with the first irradiation light L1 and the second irradiation light L2, and the computer 40 that controls the second analysis unit 20. The size of the first irradiation region A1 formed on the first main surface D1 with the first irradiation light L1 is different from the size of the second irradiation region A2 formed on the second main surface D2 with the second irradiation light L2. The computer 40 emits the first irradiation light L1 and the second irradiation light L2 while a state where the entire second irradiation region A2 overlaps the first irradiation region A1 is maintained.

A semiconductor failure analysis method for analyzing a semiconductor device D includes setting step S100 of preparing a first irradiation condition for the first irradiation light L1 emitted along the first path R1 set on the first main surface D1 of the semiconductor device D and a second irradiation condition for the second irradiation light L2 emitted along the second path R2 set on the second main surface D2 that is the back side of the first main surface D1, and analysis step S120 of acquiring the electric signal output from the semiconductor device D while the semiconductor device D is irradiated with the first irradiation light L1 and the second irradiation light L2 according to the first irradiation condition and the second irradiation condition set in setting step S100. In setting step S100, the first irradiation condition and the second irradiation condition are set such that the size of the first irradiation region A1 formed on the first main surface D1 with the first irradiation light L1 is different from the size of the second irradiation region A2 formed on the second main surface D2 with the second irradiation light L2. In analysis step S120, the first irradiation light L1 and the second irradiation light L2 are emitted while a state where the entire second irradiation region A2 overlaps the first irradiation region A1 is maintained.

In failure analysis involving the optical scanning by the first optical system 12 and the second optical system 22 disposed on both sides of the semiconductor device D, when there is an attempt to perform scanning while positions of light spots by the first optical system 12 and the second optical system 22 disposed on both sides of the semiconductor device D are caused to coincide with each other, it may be difficult to perform scanning from the accuracy of control. Thus, even in a case where the optical axis of the first optical system 12 and the optical axis of the second optical system 22 do not completely coincide with each other, it is desirable to overlap the light irradiation regions as the light spots.

In the semiconductor failure analysis device 1 and the semiconductor failure analysis method, the first main surface D1 included in the semiconductor device D is irradiated with the first irradiation light L1, and the second main surface D2 is irradiated with the second irradiation light L2. The size of the first irradiation region A1 is different from the size of the second irradiation region A2. As a result, the entire second irradiation region A2 that is the smaller region of the first irradiation region A1 and the second irradiation region A2 can be overlapped with the first irradiation region A1 that is the larger region. As a result, it is possible to reliably apply a light stimulus to the semiconductor device D from both sides of the first main surface D1 and the second main surface D2. Accordingly, since the electric signal affected by the light stimulus is output from the semiconductor device D, the failure portion can be reliably visualized. That is, the semiconductor failure analysis device 1 and the semiconductor failure analysis method can satisfactorily detect the failure portion of the semiconductor device D.

In the semiconductor failure analysis device 1 and the semiconductor failure analysis method, the sizes of the light spots by the first optical system 12 and the second optical system 22 disposed on both sides of the semiconductor device D are set to be different from each other. As a result, even in a case where the optical axes of the first optical system 12 and the second optical system 22 do not coincide with each other, the light irradiation regions can be maintained in the overlapping state.

Operations and effects of the analysis device 1 and the analysis method will be described in detail with specific examples. For example, as a first example, as illustrated in FIG. 2(a), a case where the first irradiation region A1 moves without deviating from the first path R1 and the second irradiation region A2 also moves without deviating from the second path R2 will be described. As a second example, as illustrated in FIGS. 2(b) and 2(c), the first irradiation region A1 moves without deviating from the first path R1 but the second irradiation region A2 moves while deviating from the second path R2.

As illustrated in FIG. 2(b), a case where the first irradiation region A1 and the second irradiation region A2 coincide with each other will be described. When the second irradiation region A2 moves while deviating from the second path R2, the overlapping region AL12, the first non-overlapping region AL1, and the second non-overlapping region AL2 are generated. The overlapping region AL12 is irradiated with the first irradiation light L1 and the second irradiation light L2. The first non-overlapping region AL1 is irradiated with only the first irradiation light L1. The second non-overlapping region AL2 is irradiated with only the second irradiation light L2. A state where the second irradiation region A2 moves while deviating from the second path R2 is compared with an ideal case (see FIG. 2(a)). The ideal case refers to a case where the first irradiation region A1 and the second irradiation region A2 move in a state of coinciding with each other. In a state where the second irradiation region A2 moves while deviating from the second path R2, the area of the overlapping region AL12 decreases by the area of the first non-overlapping region AL1. The failure portion is visualized in the overlapping region AL12. Accordingly, the first non-overlapping region AL1 reduces the region where the failure portion can be visualized.

As illustrated in FIG. 2(c), a case where the second irradiation region A2 is larger than the first irradiation region A1 will be described. Even in a case where the first irradiation region A1 moves while deviating from the first path R1, the second irradiation region A2 constantly overlaps the first irradiation region A1. That is, in a case where the first irradiation region A1 is larger than the second irradiation region A2, the overlapping region AL12 having the same area as the overlapping region AL12 obtained by the ideal operation as illustrated in FIG. 2(a) is obtained. Accordingly, even though the position of the irradiation light deviates from the path, the overlapping region AL12 where the failure portion can be visualized does not decrease.

In the semiconductor failure analysis device 1, the size of the second irradiation region A2 is smaller than the size of the first irradiation region A1. The computer 40 outputs the control signal to the second analysis unit 20. With this configuration, the entire second irradiation region A2 can be reliably overlapped with the first irradiation region A1.

The first analysis unit 10 of the semiconductor failure analysis device 1 includes the first optical scanning unit 12s that reflects the first irradiation light L1 such that the first irradiation region A1 moves along the first path R1. The second analysis unit 20 includes the second optical scanning unit 22s that reflects the second irradiation light L2 such that the second irradiation region A2 moves along the second path R2. The computer 40 controls the first optical scanning unit 12s and the second optical scanning unit 22s by using the ratio based on the size of the first irradiation region A1 and the size of the second irradiation region A2. Even with this configuration, the entire first irradiation region A1 can be reliably overlapped with the second irradiation region A2.

The first analysis unit 10 of the semiconductor failure analysis device 1 includes the first irradiation light source 11 that generates the first irradiation light L1 and the first objective lens 12a that guides the first irradiation light L1 from the first irradiation light source 11 to the first main surface D1. The second analysis unit 20 includes the second irradiation light source 21 that generates the second irradiation light L2 and the second objective lens 22a that guides the second irradiation light L2 from the second irradiation light source 21 to the second main surface D2. The difference between the size of the first irradiation region A1 and the size of the second irradiation region A2 is caused by the difference between the magnification that is the optical characteristic of the first objective lens 12a and the magnification that is the optical characteristic of the second objective lens 22a. With this configuration, the difference between the size of the first irradiation region A1 and the size of the second irradiation region A2 can be generated by selecting the magnification of the objective lens.

<Semiconductor Failure Analysis Device of Second Embodiment>

A semiconductor failure analysis device according to a second embodiment specifies a failure portion by an optical probing technique called EOP analysis or electro-optical frequency mapping (EOFM) analysis. Optical probed thermo-reflectance image mapping (OPTIM) may be performed by using the EOFM analysis. The optical probing technique specifies a portion in a circuit operating at a target frequency. In the optical probing technique, an integrated circuit is irradiated with light emitted from a light source. Light reflected by the integrated circuit is detected by an optical sensor. A signal component having a target frequency is extracted from a detection signal output from the optical sensor. Amplitude energy of the extracted signal component is displayed as the lapse of time. The amplitude energy of the extracted signal component is displayed as a two-dimensional map.

The optical probing technique analyzes a failure of a semiconductor device D based on the modulation of the light intensity from the semiconductor device D being driven. The semiconductor failure analysis device applies an electric signal having a predetermined modulation frequency to the semiconductor device D. The modulation frequency is often higher than the frequency of the stimulus signal used for analysis for specifying a position of a heat source. For example, the semiconductor failure analysis device gives, as the stimulus signal, a drive current having a frequency equivalent to a drive signal of the semiconductor device D.

Since the optical probing technique is based on the modulation of the light intensity from the semiconductor device D being driven, the reflected light generated in accordance with the irradiation light is used for analysis. Information acquired by an analysis device 1A is not an electric signal output from the semiconductor device D when the first irradiation light L1 and the second irradiation light L2 are emitted. The information acquired by the analysis device 1A is first response light H1 and second response light H2. The first response light H1 is generated by the reflection of the first irradiation light L1 on a first main surface D1. The second response light H2 is generated by the reflection of the second irradiation light L2 on a second main surface D2.

Figure 8:
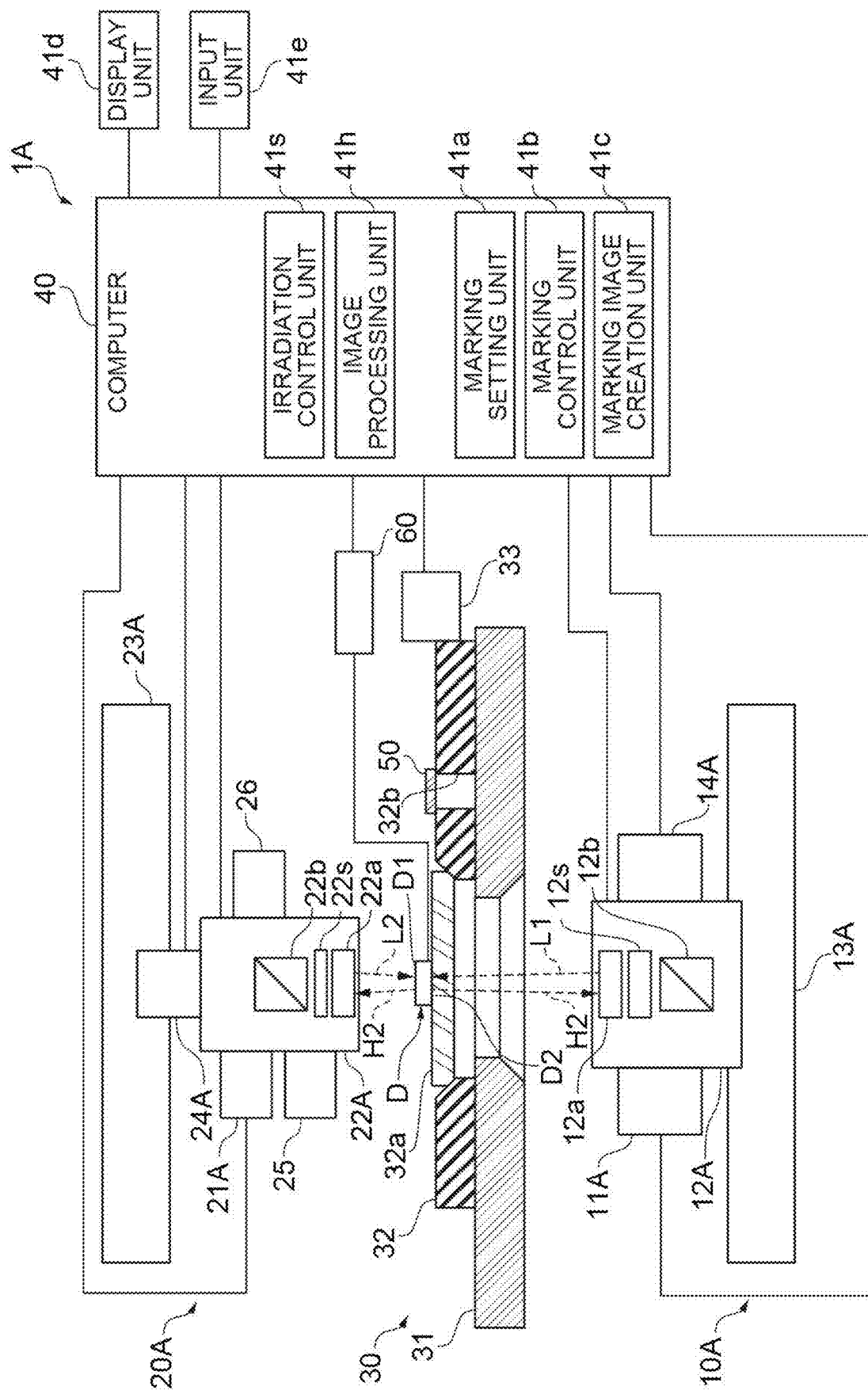
FIG. 8 is a configuration diagram of a semiconductor failure analysis device of a second embodiment.

As illustrated in FIG. 8, the semiconductor failure analysis device (hereinafter, referred to as the "analysis device 1A") of the second embodiment includes a first analysis unit 10A, a second analysis unit 20A, a device disposition unit 30, a computer 40, and a stimulus signal application unit 60. The analysis device 1A of the second embodiment does not include an electric signal acquisition unit 61 included in the analysis device 1 of the first embodiment.

The first analysis unit 10A includes a first irradiation light source 11A, a first optical system 12A, a first XYZ stage 13A, and a first camera 14A. The first irradiation light source 11A generates non-coherent light as irradiation light for EOP analysis or EOFM analysis. The light output from the first irradiation light source 11A is, for example, light in a wavelength band of 530 nm or more. The light output from the first irradiation light source 11A is preferably light in a wavelength band of 1064 nm or more. The first optical system 12A is similar to the first optical system 12 of the first embodiment. A magnification of a first objective lens 12a of the first optical system 12A is lower than a magnification of a second objective lens 22a of the second optical system 22A. The first camera 14A has a configuration capable of detecting the first response light H1 from the first main surface D1.

The second analysis unit 20A includes a second irradiation light source 21A, a second optical system 22A, and a second camera 24A. Similarly to the first irradiation light source 11A, the second irradiation light source 21A also generates non-coherent light. The second optical system 22A is similar to the second optical system 22 of the first embodiment. The magnification of the second objective lens 22a of the second optical system 22A is higher than the magnification of the first objective lens 12a of the first optical system 12A. The second camera 24A has a configuration capable of detecting the second response light H2 from the second main surface D2.

In the analysis device 1A of the second embodiment, the magnification of the first objective lens 12a and the magnification of the second objective lens 22a are different from each other. Similarly to the analysis device 1, the size of the first irradiation region A1 and the size of the second irradiation region A2 are different from each other (see FIG. 2). Accordingly, even though the second irradiation light L2 deviates from a scheduled second path R2, an overlapping region AL does not become narrow. Accordingly, the analysis device 1A of the second embodiment can reliably visualize the failure portion.

Any one of the first analysis unit 10A and the second analysis unit 20A may have a function of adding a mark indicating the failure portion. Any one of the first analysis unit 10A and the second analysis unit 20A may include the marking light source 26 of the first embodiment.

<Semiconductor Failure Analysis of Second Embodiment>

Figure 9:
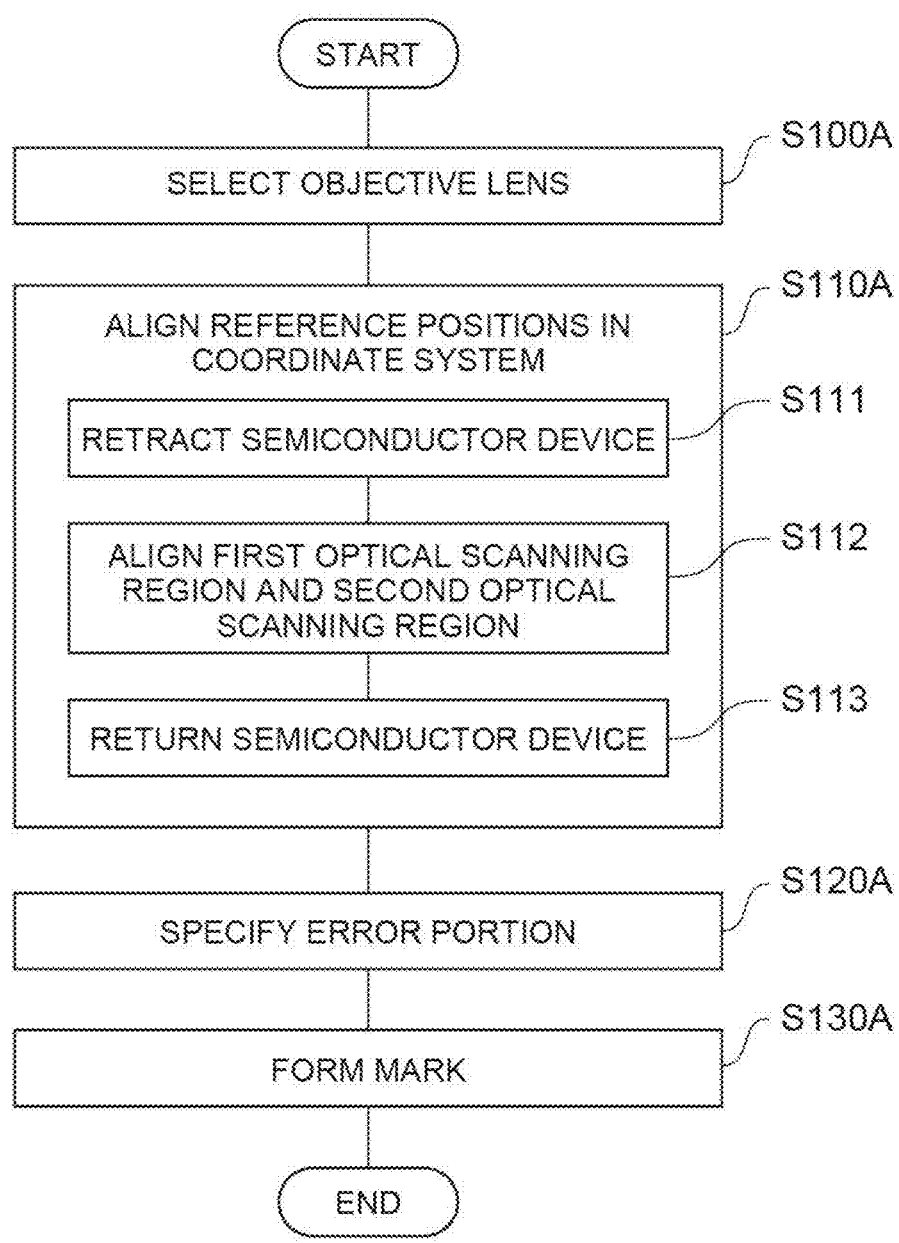
FIG. 9 is a flowchart illustrating main steps of the semiconductor failure analysis method using the analysis device of FIG. 2.

Next, analysis processing of the analysis device 1A will be described. FIG. 9 is a flowchart illustrating main steps of analysis processing using the analysis device 1A.

<Setting Step S100A>

Setting step S100A of the second embodiment is the same as setting step S100 of the first embodiment. In setting step S100A, the lens is selected such that the magnification of the second objective lens 22a is larger than the magnification of the first objective lens 12a.

<Alignment Step S110A>

Alignment step S110A of the second embodiment is the same as alignment step S110 of the first embodiment.

<Analysis Step S120A>

Subsequently, the failure portion of the semiconductor device D is specified (S120A). The first analysis unit 10A irradiates the first main surface D1 of the semiconductor device D with the first irradiation light L1 generated by the first irradiation light source 11A by the first optical scanning unit 12s. The second analysis unit 20A irradiates the second main surface D2 of the semiconductor device D with the second irradiation light L2 generated by the second irradiation light source 21A by the second optical scanning unit 23s. The computer 40 controls the second optical scanning unit 22s such that the second irradiation region A2 moves along the second path R2 while a state where the first irradiation region A1 and the second irradiation region A2 overlap each other is maintained. In the first analysis unit 10A, the first optical scanning unit 12s operates such that the first irradiation region A1 moves along the first path R1 while a state where the first irradiation region A1 and the second irradiation region A2 overlap each other according to the control signal output from the second analysis unit 20A is maintained.

The second irradiation light L2 is reflected by the second main surface D2 of the semiconductor device D. The reflected light is incident, as the second response light H2, on the second analysis unit 20A. The second response light H2 is detected by the second camera 24A. The second camera 24A outputs information based on the second response light H2 to the computer 40. The first irradiation light L1 is also finally output, as information based on the first response light H1, to the computer 40 through a procedure similar to the second irradiation light L2.

Subsequently, the stimulus signal application unit 60 outputs a stimulus signal such as a test pattern to the semiconductor device D. The first analysis unit 10A irradiates the semiconductor device D that has received the stimulus signal with the first irradiation light L1. The second analysis unit 20A irradiates the semiconductor device D that has received the stimulus signal with the second irradiation light L2. In this operation, an irradiation position selected by the user is irradiated with the first irradiation light L1 and the second irradiation light L2. The user may input the irradiation position to the computer 40 by using an input unit 41e while viewing an optical reflected image displayed on a display unit 41d. The first camera 14A detects the first response light H1 from the semiconductor device D receiving the stimulus signal. The second camera 24A detects the second response light H2 from the semiconductor device D receiving the stimulus signal. The first camera 14A outputs the information based on the first response light H to the computer 40 to the computer 40. The second camera 24A outputs the information based on the second response light H2 to the computer 40 to the computer 40.

In the semiconductor device D receiving the stimulus signal, elements constituting the semiconductor device D operate. The response light from the semiconductor device D in which the element is operating is modulated with an operation of the element.

An image processing unit 41h of the computer 40 generates a signal waveform by using detection signals output from the first camera 14A and the second camera 24A. The image processing unit 41h displays the signal waveform on the display unit 41d. The computer 40 acquires the detection signal and generates the signal waveform while the irradiation position is changed based on the optical reflected image. When the generated signal waveform is used, the failure portion can be specified.

The image processing unit 41h may generate an electro-optical frequency mapping image (EOFM image). The EOFM image is obtained by imaging phase difference information between the stimulus signal such as the test pattern and the detection signal in association with the irradiation position. The phase difference information can be obtained from an AC component extracted from the detection signal. The optical reflected image can be obtained by imaging a DC component extracted simultaneously with the AC component in association with the irradiation position. A superimposed image obtained by superimposing the EOFM image on the optical reflected image can be used as an analysis image.

<Marking Step S130A>

Marking step S130A of the first embodiment is the same as marking step S130A of the first embodiment.

<Operations and Effects>

The analysis device 1A of the second embodiment can also obtain operations and effects similar to the analysis device 1 of the first embodiment. The analysis device 1A of the second embodiment also suppresses the decrease in the overlapping region AL12 that reliably visualizes the failure portion. As a result, the analysis device 1A of the second embodiment satisfactorily detects the failure portion of the semiconductor device D.

The present invention is not limited to the semiconductor failure analysis device 1 of the first embodiment and the semiconductor failure analysis device 1A of the second embodiment. As described in the description of the first embodiment, the configuration in which the size of the first irradiation region A1 is different from the size of the second irradiation region A2 does not need to be the difference in magnification between the first objective lens 12a and the second objective lens 22a.

In the configuration in which the magnification of the objective lens is set to be different, the optical characteristics of the optical members are set to be different. In other words, it can be said that the optical member constituting the first analysis unit 10 and the optical member constituting the second analysis unit 20 are different from each other. The case where the "members are different" may be a case where the members have different optical characteristics as in the first embodiment. The case where the "members are different" may be a case where the configuration of the optical member included in the first analysis unit 10 may be different from the configuration of the optical member included in the second analysis unit 20. Such a configuration will be described as Modifications 1 to 4.

Even though the optical characteristics of the optical members constituting the first analysis unit 10 and the second analysis unit 20 are the same, the size of the first irradiation region A1 and the size of the second irradiation region A2 can be set to be different by setting the arrangement of the optical members to be different. Such a configuration will be described as Modifications 5 to 7.

Even though the optical characteristics and disposition of the optical members constituting the first analysis unit 10 and the second analysis unit 20 are the same, the size of the first irradiation region A1 and the size of the second irradiation region A2 can be set to be different by setting the first path R1 and the second path R2 to be different. Such a configuration will be described as Modification 8.

<Modification 1>

Figure 10:
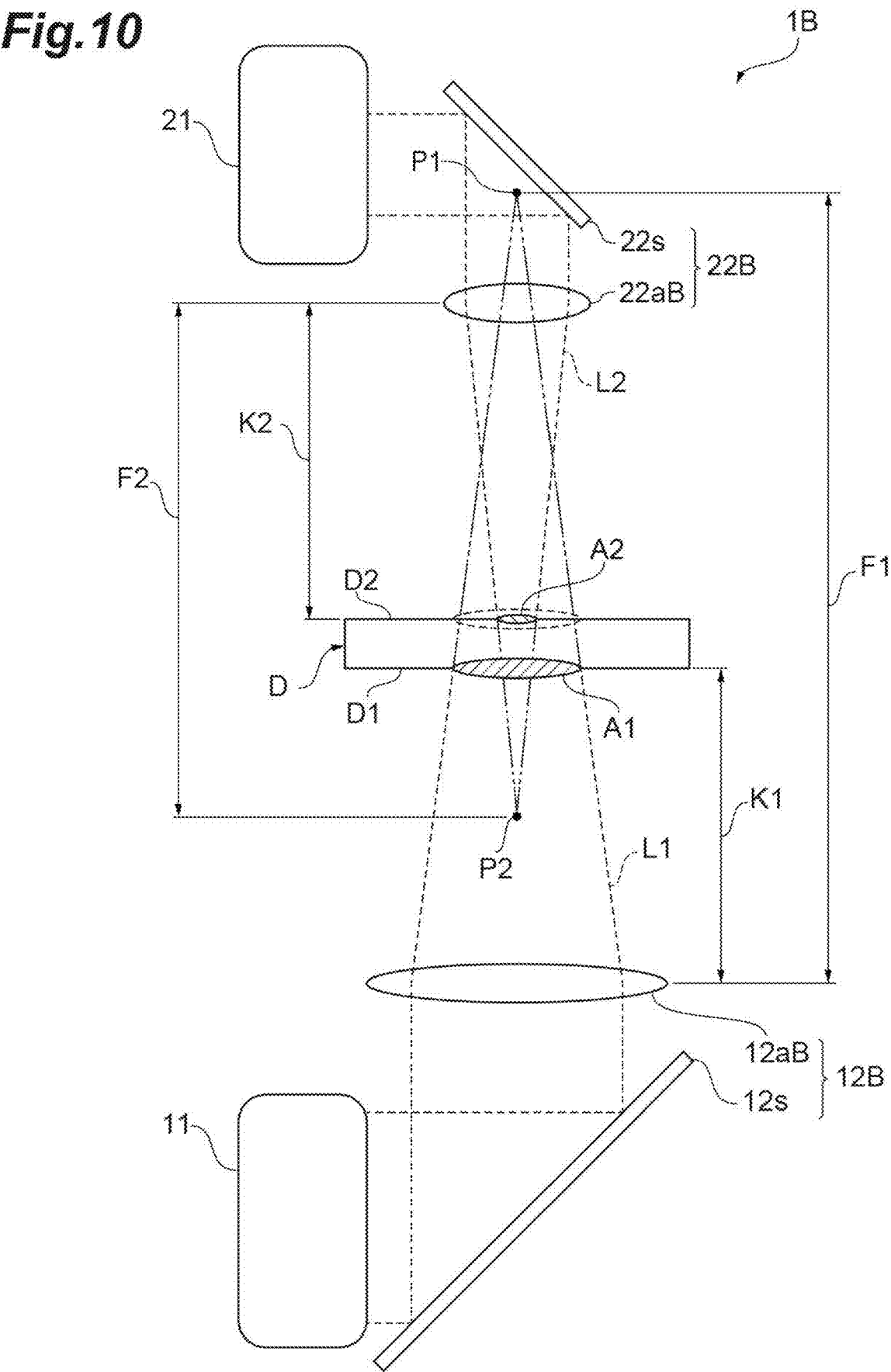
FIG. 10 is a configuration diagram of a first optical system and a second optical system included in a failure analysis device of Modification 1.

FIG. 10 illustrates a first optical system 12B and a second optical system 22B of a semiconductor failure analysis device 1B of Modification 1. In Modification 1, optical characteristics of optical components are different from each other. The different optical components are a first objective lens 12aB and a second objective lens 22aB. The different optical characteristic is a numerical aperture (NA). For example, as in the first embodiment, it is assumed that a size of a second irradiation region A2 is smaller than a size of a first irradiation region A1. In this case, the numerical aperture (NA) of the second objective lens 22aB may be set to be smaller than the numerical aperture (NA) of the first objective lens 12aB. According to such a difference in optical characteristics, the size of the second irradiation region A2 can be set to be smaller than the size of the first irradiation region A1 in a state where a distance K1 from the first objective lens 12aB to a first main surface D1 and a distance K2 from the second objective lens 22aB to a second main surface D2 are the same.

Instead of the numerical apertures (NA) of the first objective lens 12aB and the second objective lens 22aB, a numerical aperture (NA) of a first irradiation light source 11 and a numerical aperture (NA) of a second irradiation light source 21 may be set to be different.

<Modification 2>

Figure 11:
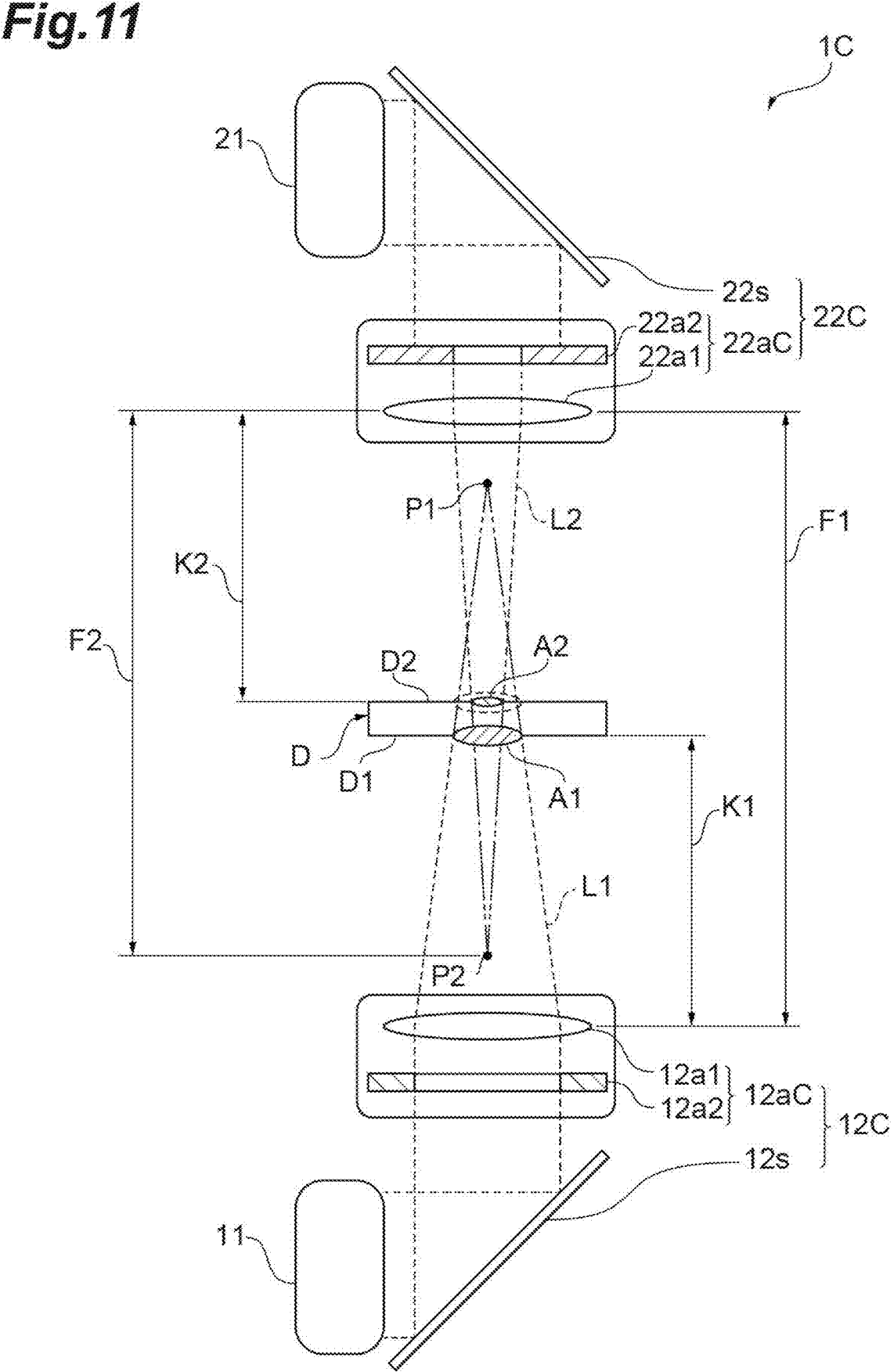
FIG. 11 is a configuration diagram of a first optical system and a second optical system included in a failure analysis device of Modification 2.

FIG. 11 illustrates a first optical system 12C and a second optical system 22C of a semiconductor failure analysis device 1C of Modification 2. In Modification 2, configurations of optical components are different from each other. The different optical components are a first objective lens 12aC and a second objective lens 22aC. The first objective lens 12aC includes a lens 12a1 and a first pupil 12a2. The first pupil 12a2 is, for example, a disk member having a through-hole. The first pupil 12a2 narrows first irradiation light L1 entering the lens 12a1. The second objective lens 22aC includes a lens 22a1 and a second pupil 22a2. The second pupil 22a2 is also a disk member having a through-hole. The second pupil 22a2 narrows second irradiation light L2 entering the lens 22a1. For example, as in the first embodiment, it is assumed that a size of a second irradiation region A2 is smaller than a size of a first irradiation region A1. In this case, an inner diameter (opening diameter) of the through-hole of the second pupil 22a2 may be smaller than an inner diameter (opening diameter) of the through-hole of the first pupil 12a2. Even with such a difference in configuration, the size of the second irradiation region A2 can be set to be smaller than the size of the first irradiation region A1 in a state where a distance K1 from the first objective lens 12aC to a first main surface D1 and a distance K2 from the second objective lens 22aC to a second main surface D2 are the same as in Modification 1.

<Modification 3>

Figure 12:
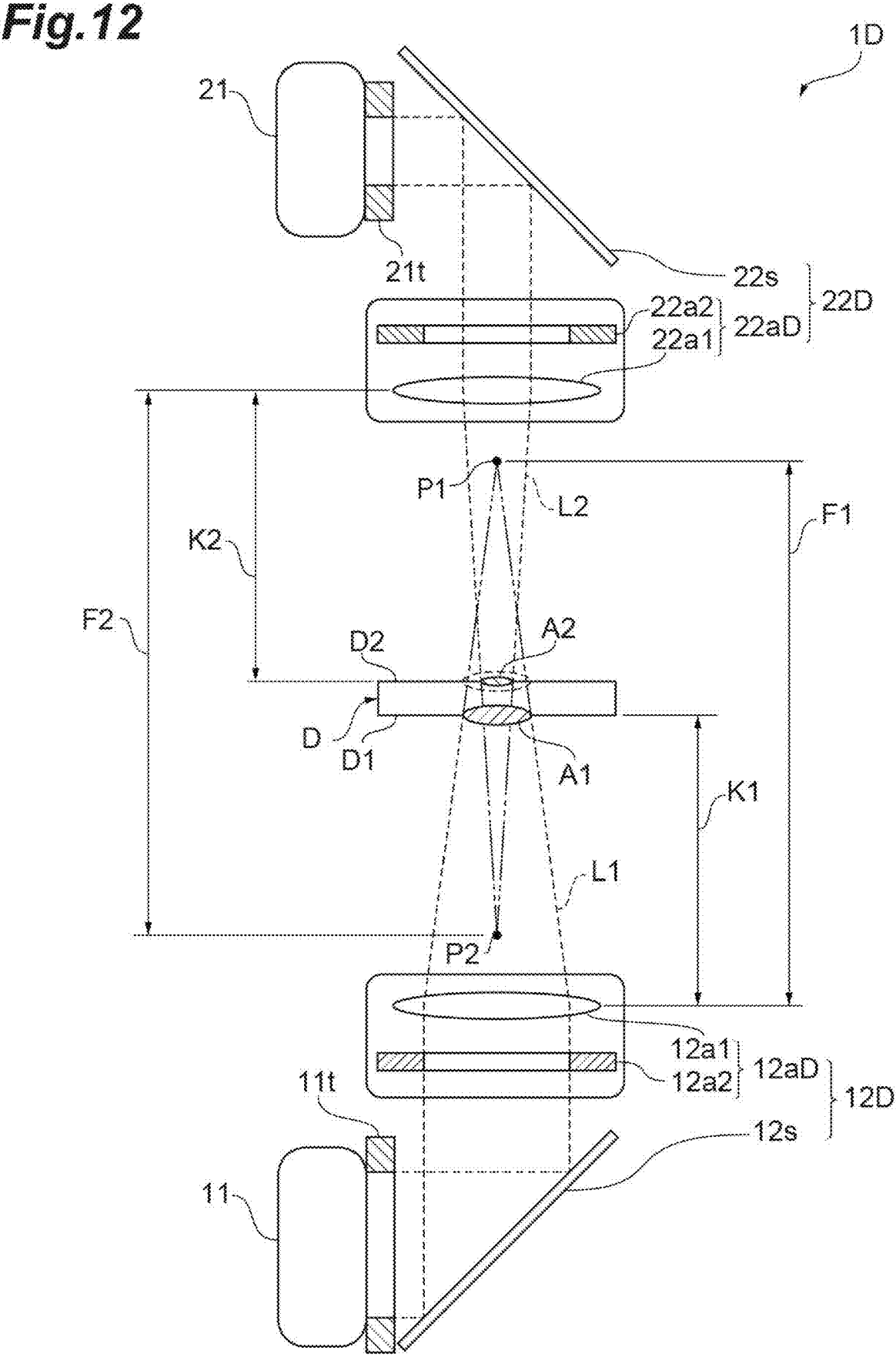
FIG. 12 is a configuration diagram of a first optical system and a second optical system included in a failure analysis device of Modification 3.

FIG. 12 illustrates a first optical system 12D and a second optical system 22D of a semiconductor failure analysis device ID of Modification 3. In Modification 3, configurations of optical components are different from each other. The different optical components are a first diaphragm 11t and a second diaphragm 21t. The first diaphragm 11t is disposed on an optical path from a first irradiation light source 11 to a first optical scanning unit 12s. The first diaphragm 11t is a disk member having a through-hole. The second diaphragm 21t is disposed on an optical path from a second irradiation light source 21 to a second optical scanning unit 22s. The second diaphragm 21t is also a disk member having a through-hole. For example, as in the first embodiment, it is assumed that a size of a second irradiation region A2 is smaller than a size of a first irradiation region A1. In this case, an inner diameter (opening diameter) of the through-hole of the second diaphragm 21t may be smaller than an inner diameter (opening diameter) of the through-hole of the first diaphragm 11t.

With this configuration, first irradiation light L1 narrowed by the first diaphragm 11t enters a first pupil 12a2 of a first objective lens 12aD. Second irradiation light L2 narrowed by the second diaphragm 21t enters a second pupil 22a2 of a second objective lens 22aD. Even with such a difference in configuration, a size of a second irradiation region A2 can be set to be smaller than a size of a first irradiation region A1 in a state where a distance K1 from the first objective lens 12aD to a first main surface D1 and a distance K2 from the second objective lens 22aD to a second main surface D2 are the same as in Modification 1.

<Modification 4>

Figure 13:
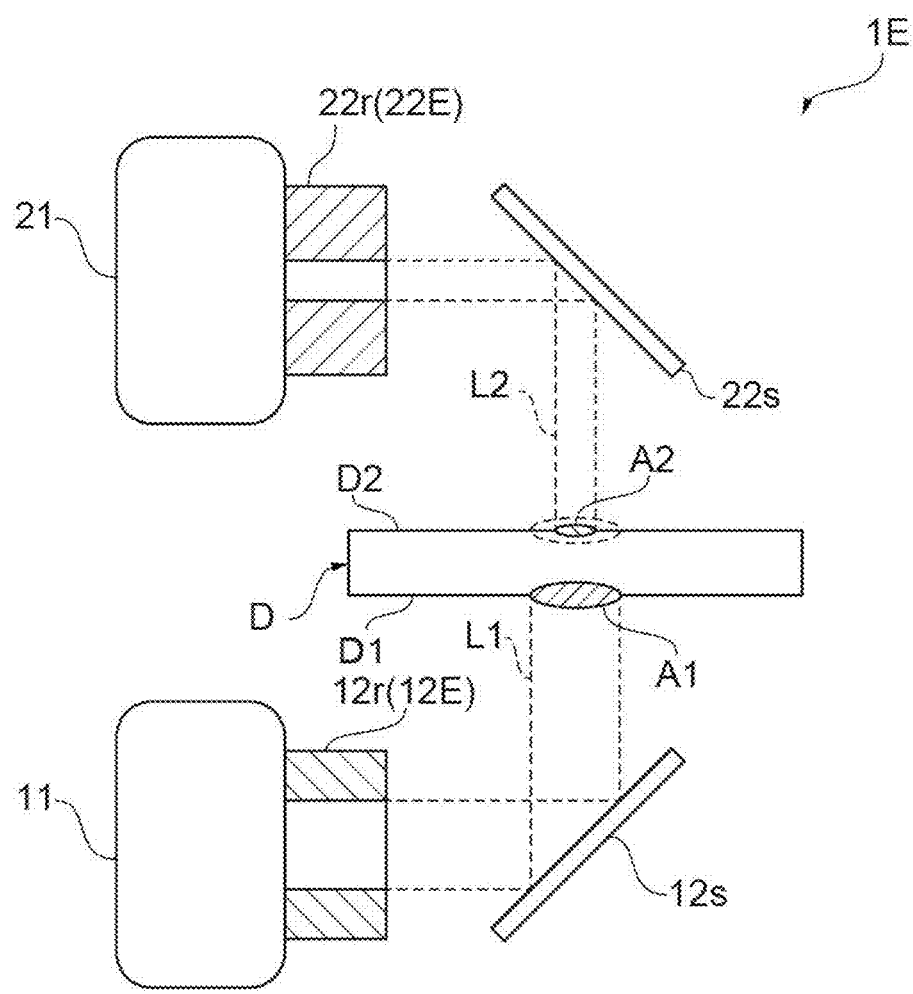
FIG. 13 is a configuration diagram of a first optical system and a second optical system included in a failure analysis device of Modification 4.

FIG. 13 illustrates a first optical system 12E and a second optical system 22E of a semiconductor failure analysis device 1E of Modification 4. In Modification 3, configurations of optical components are different from each other. The different optical components are a first fiber 12r and a second fiber 22r. The first optical system 12E includes the first fiber 12r instead of a first objective lens 12a. The first fiber 12r guides first irradiation light L1 from a first irradiation light source 11 to a first optical scanning unit 12s. A light diameter of the first irradiation light L1 emitted from the first fiber 12r corresponds to a core diameter of the first fiber 12r. The first irradiation light L1 emitted from the first fiber 12r is incident on the first optical scanning unit 12s while the light diameter corresponding to the core diameter of the first fiber 12r is maintained. The first irradiation light L1 incident on the first optical scanning unit 12s reaches a first main surface D1. The second optical system 22E also includes a second fiber 22r instead of a second objective lens 22a. Second irradiation light L2 emitted from the second fiber 22r is incident on a second optical scanning unit 22s while a light diameter corresponding to the core diameter of the second fiber 22r is maintained. The second irradiation light L2 incident on the second optical scanning unit 22s reaches a second main surface D2. The first fiber 12r is a multimode fiber, whereas the second fiber 22r is a single mode fiber. A core diameter of the multimode fiber is larger than a core diameter of the single mode fiber. Accordingly, a light diameter of the first irradiation light L1 emitted from the first fiber 12r that is the multimode fiber is larger than a light diameter of the second irradiation light L2 emitted from the second fiber 22r that is the single mode fiber. Even with such a difference in configuration, a size of a second irradiation region A2 can be set to be smaller than a size of a first irradiation region A1.

As another example, for example, an optical system that forms a large irradiation region may include a spiral polarizing filter. In this case, the irradiation light with which the semiconductor device D is irradiated from the optical system is a so-called vector beam. According to such a configuration, since the irradiation light has a multiple ring shape, the irradiation region can be enlarged.

Hereinafter, Modifications 5 to 7 in which the dispositions of the optical members are different from each other will be described.

<Modification 5>

Figure 14:
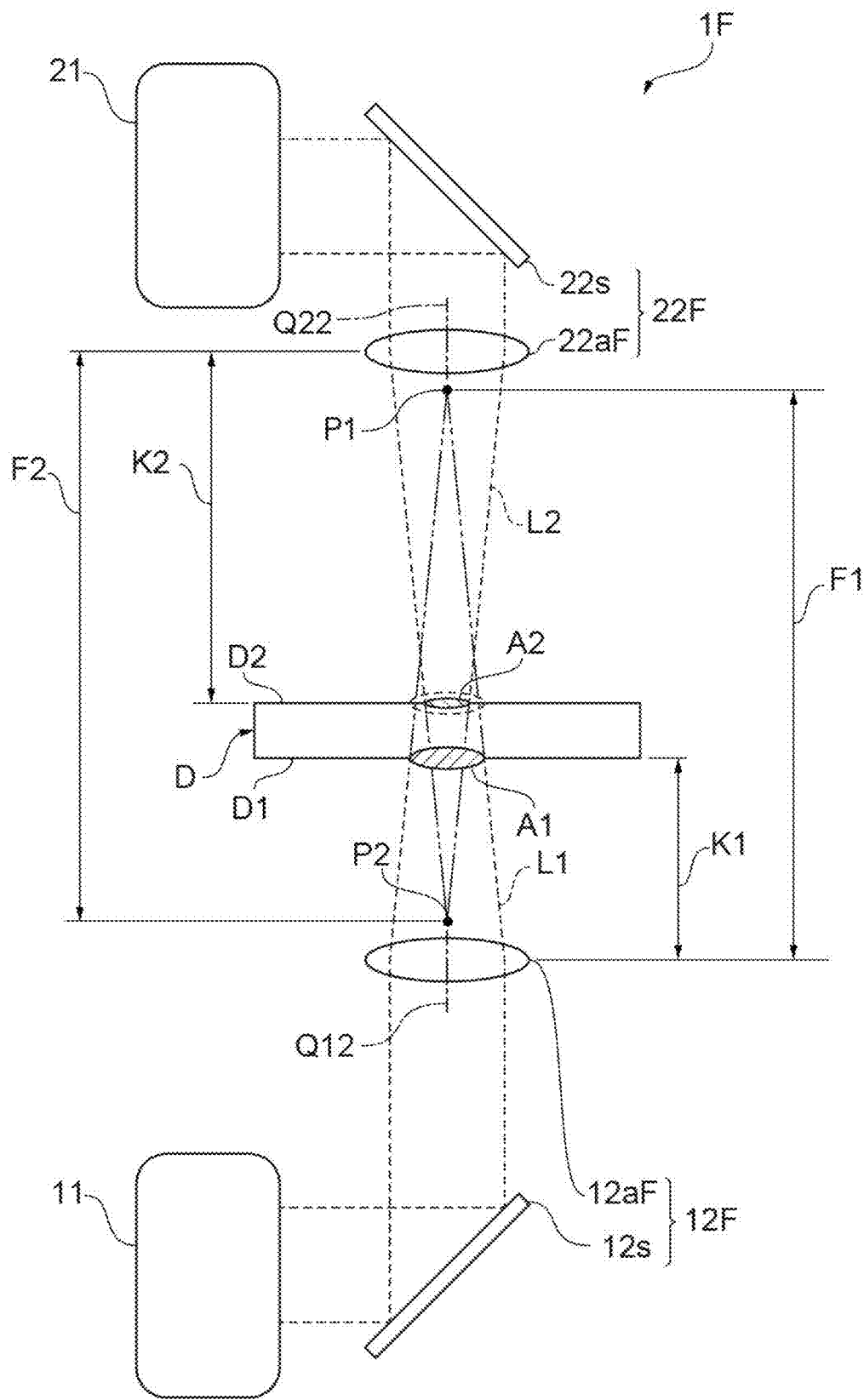
FIG. 14 is a configuration diagram of a first optical system and a second optical system included in a failure analysis device of Modification 5.

FIG. 14 illustrates a first optical system 12F and a second optical system 22F of a semiconductor failure analysis device 1F of Modification 5. In Modification 5, the disposition of an optical component of the first optical system 12F and the disposition of an optical component of the second optical system 22F are different from each other. The optical components having different dispositions are a first objective lens 12aF and a second objective lens 22aF. Optical characteristics of the first objective lens 12aF are the same as optical characteristics of the second objective lens 22aF. A magnification of the first objective lens 12aF is the same as a magnification of the second objective lens 22aF. A numerical aperture (NA) of the first objective lens 12aF is also the same as a numerical aperture (NA) of the second objective lens 22aF. A first focal point F1 of the first objective lens 12aF is also the same as a second focal point F2 of the second objective lens 22aF. In Modification 5, a position of the first objective lens 12aF and a position of the second objective lens 22aF with the semiconductor device D as a reference are different from each other. Specifically, a distance K1 from a first main surface D1 of the semiconductor device D to the first objective lens 12aF and a distance K2 from a second main surface D2 of the semiconductor device D to the second objective lens 22aF are different from each other. In Modification 5, an optical axis Q12 of the first objective lens 12aF overlaps an optical axis Q22 of the second objective lens 22aF. The optical axis Q12 of the first objective lens 12aF coincides with the optical axis Q22 of the second objective lens 22aF. For example, as in the first embodiment, it is assumed that a size of a second irradiation region A2 is smaller than a size of a first irradiation region A1. In this case, a distance K2 may be set to be larger than a distance K1. With this configuration, even though the optical member constituting the first optical system 12F and the optical member constituting the second optical system 22F are set to be common, a size of a second irradiation region A2 can be set to be smaller than a size of a first irradiation region A1.

<Modification 6>

Figure 15:
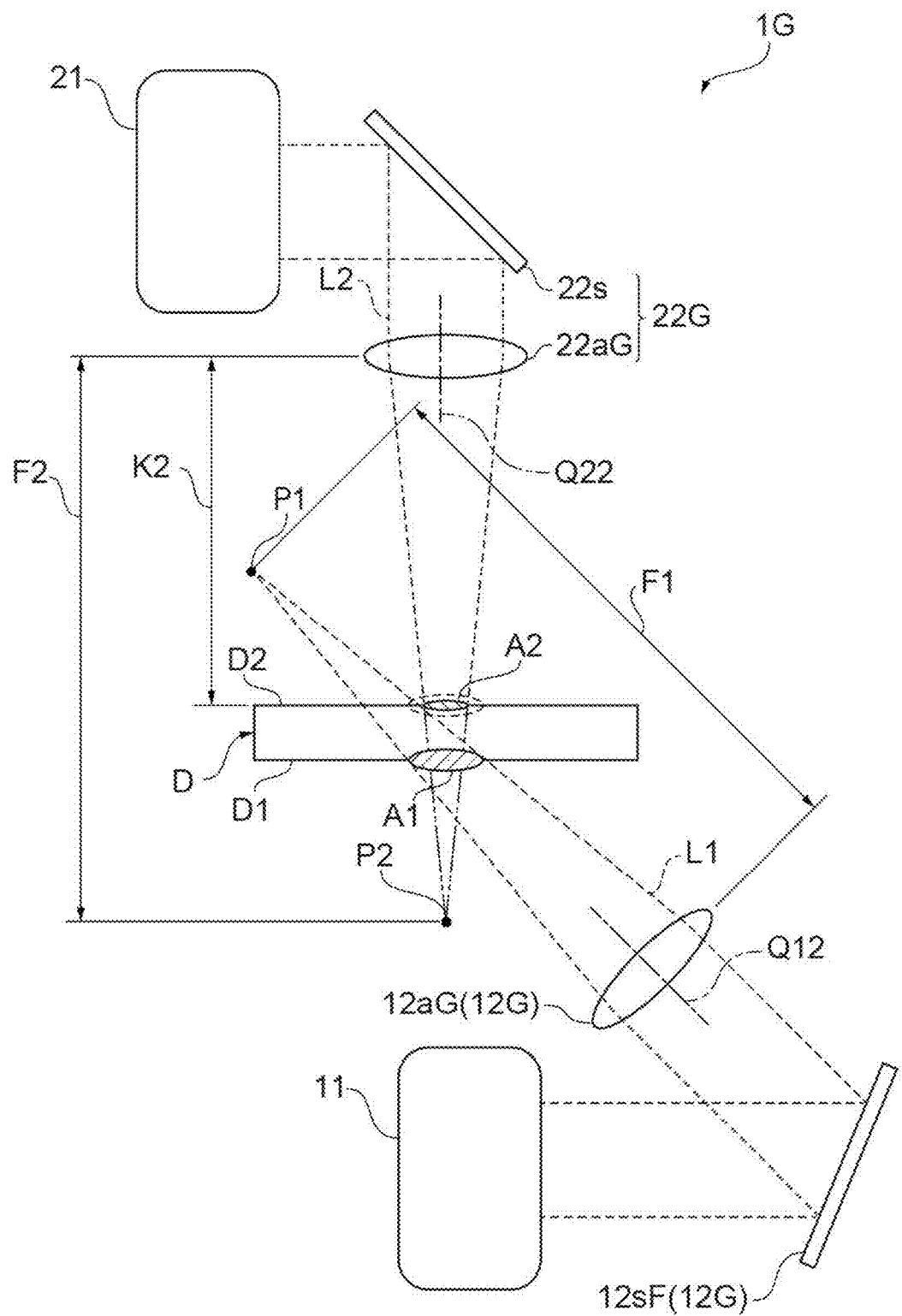
FIG. 15 is a configuration diagram of a first optical system and a second optical system included in a failure analysis device of Modification 6.

FIG. 15 illustrates a first optical system 12G and a second optical system 22G of a semiconductor failure analysis device 1G of Modification 6. In Modification 6, the disposition of an optical component of the first optical system 12G and the disposition of an optical component of the second optical system 22G are different from each other. The optical components having different dispositions are a first objective lens 12aG and a second objective lens 22aG. Similarly to Modification 5, optical characteristics (magnification, NA, and focal point) of the first objective lens 12aG and optical characteristics (magnification, NA, and focal point) of the second objective lens 22aG may be the same. In Modification 5, it has been described that the optical axis Q12 of the first objective lens 12aF coincides with the optical axis Q22 of the second objective lens 22aF. In contrast, in Modification 6, an optical axis Q12 of the first objective lens 12aG does not coincide with an optical axis Q22 of the second objective lens 22aG. Specifically, the optical axis Q22 of the second objective lens 22aG forming a smaller irradiation region is orthogonal to a second main surface D2. By doing this, a shape of a second irradiation region A2 is a circle. On the other hand, the optical axis Q22 of the first objective lens 12aG forming a larger irradiation region is not orthogonal to a first main surface D1. The optical axis Q22 is inclined with respect to a normal line of the first main surface D1. By doing this, a shape of a first irradiation region A1 is, for example, an ellipse that appears when a cone is obliquely cut. Even with this configuration, even though the optical member constituting the first optical system 12G and the optical member constituting the second optical system 22G are set to be common, a size of the second irradiation region A2 can be set to be smaller than a size of the first irradiation region A1.

<Modification 7>

Figure 16:
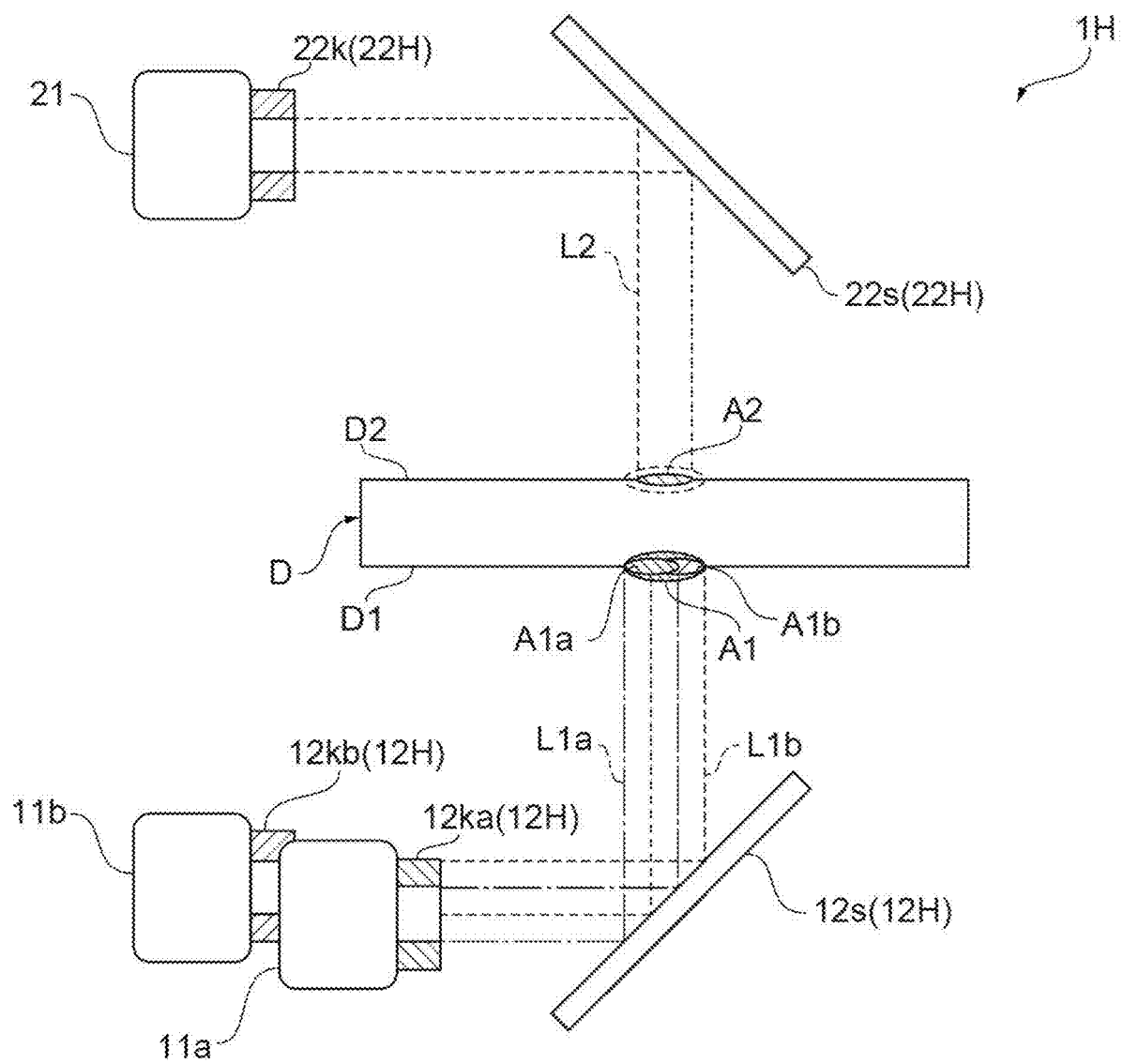
FIG. 16 is a configuration diagram of a first optical system and a second optical system included in a failure analysis device of Modification 7.

FIG. 16 illustrates a first optical system 12H and a second optical system 22H of a semiconductor failure analysis device 1H of Modification 7. In Modification 7, the disposition of an optical component of the first optical system 12H and the disposition of an optical component of the second optical system 22H are different from each other. The first optical system 12H includes a pair of first fibers 12ka and 12kb. FIG. 15 illustrates two first fibers 12ka and 12kb. However, the number of first fibers included in the first optical system 12H may be two or more. The number of first fibers may be larger than the number of second fibers. The first optical system 12H includes first irradiation light sources 11a and 11b corresponding to the number of fibers. The first optical system 12H may supply irradiation light from one light source to a plurality of fibers. An optical axis of the first fiber 12ka deviates in parallel with an optical axis of the first fiber 12kb. First irradiation light L1a generated by the first irradiation light source 11a and emitted from the first fiber 12ka forms a first irradiation region A1a. First irradiation light L1b generated by the first irradiation light source 11b and emitted from the first fiber 12kb forms a first irradiation region A1b. The first irradiation region A1a overlaps a part of the first irradiation region A1b. As a result, a first irradiation region A1 is formed by the first irradiation regions A1a and A1b. The second optical system 22H includes one second fiber 22k. All the first fibers 12ka and 12kb and the second fiber 22k of Modification 7 have the same optical characteristics. For example, the first fibers 12ka and 12kb and the second fiber 22k are single mode fibers. According to such a configuration, the optical system forming a larger irradiation region includes a plurality of optical fibers, and the larger irradiation region can be formed by the irradiation light emitted from each optical fiber. Accordingly, even with this configuration, even though the optical member constituting the first optical system 12H and the optical member constituting the second optical system 22H are set to be common, a size of a second irradiation region A2 can be set to be smaller than a size of the first irradiation region A1.

Hereinafter, Modification 8 in which a first path R1 and a second path R2 are different from each other will be described.

<Modification 8>

FIG. 17 illustrates a first path R1 and a second path R2 in a semiconductor failure analysis device of Modification 8. In Modification 8, only the paths are different. In Modification 8, an optical member constituting a first optical system and an optical member constituting a second optical system are common. In Modification 8, the disposition of optical components is also common. Modification 8 is realized by control of a computer 40 that controls the first optical system and the second optical system. A case where a size of a second irradiation region A2 is smaller than a size of a first irradiation region A1 as in the first embodiment will be exemplified. It is assumed that a size of an irradiation spot L2s of second irradiation light L2 is the same as a size of an irradiation spot L1s of first irradiation light L1. As illustrated in FIG. 17(a), the irradiation spot L2s is linearly moved along the second path R2. The second path R2 is a straight line. In contrast, the irradiation spot L1s is moved along the first path R1 traveling while crossing the second path R2. More specifically, the first path R1 includes a portion R1a and a portion R1b. The portion R1a travels in parallel with a traveling direction of the second path R2 in a state of deviating in a direction orthogonal to the traveling direction of the second path R2. The portion R1b travels in a direction orthogonal to the second path R2. As illustrated in FIG. 17(b), the first irradiation region A1 having an area larger than the irradiation spot L1s is formed. The first irradiation region A1 of Modification 8 is obtained by enlarging the irradiation region in a pseudo manner. It can also be said that, in such path setting, one path length is set to be longer than the other path length, for example. It can also be said that, in such path setting, one scanning speed is set to be higher than the other scanning speed. According to such an operation, even though the optical member constituting the first optical system and the optical member constituting the second optical system are set to be common, the size of the second irradiation region A2 can be set to be smaller than the size of the first irradiation region A1.

REFERENCE SIGNS LIST 1, 1A, 1B, 1C, 1D, 1E, 1F, 1G, 1H Semiconductor failure analysis device
10, 10A First analysis unit
11, 11A, 11a, 11b First irradiation light source (first light source)
20, 20A Second analysis unit
21, 21A Second irradiation light source (second light source)
61 Electric signal acquisition unit
A1, A1a, A1b First irradiation region
A2 Second irradiation region
D Semiconductor device
D1 First main surface
D2 Second main surface
H1 First response light
H2 Second response light
L1, L1a, L1b First irradiation light
L2 Second irradiation light
R1 First path
R2 Second path
S100, S100A Setting step
S120 Analysis step

The invention claimed is:

1. A semiconductor failure analysis device comprising:
a first analyzer configured to emit first irradiation light along a first path set on a first main surface of a semiconductor device;
a second analyzer configured to emit second irradiation light along a second path set on a second main surface that is a back side of the first main surface;
an electric signal meter configured to receive an electric signal output by the semiconductor device irradiated with the first irradiation light and the second irradiation light; and
a controller configured to control at least one of the first analyzer and the second analyzer, wherein
a size of a first irradiation region formed on the first main surface with the first irradiation light is different from a size of a second irradiation region formed on the second main surface with the second irradiation light, and
the controller is configured to output a control signal for emitting the first irradiation light and the second irradiation light while a state where an entire one region of the first irradiation region and the second irradiation region overlaps the other region of the first irradiation region and the second irradiation region is maintained.

2. The semiconductor failure analysis device according to claim 1, wherein
the size of the second irradiation region is smaller than the size of the first irradiation region, and
the controller is configured to output the control signal to the second analyzer.

3. The semiconductor failure analysis device according to claim 1, wherein
the first analyzer includes a first optical scanner configured to reflect the first irradiation light such that the first irradiation region moves along the first path,
the second analyzer includes a second optical scanner configured to reflect the second irradiation light such that the second irradiation region moves along the second path, and
the controller controls the first optical scanner and the second optical scanner by using a ratio based on the size of the first irradiation region and the size of the second irradiation region.

4. The semiconductor failure analysis device according to claim 1, wherein
the first analyzer includes
a first light source configured to generate the first irradiation light, and a first optical member configured to guide the first irradiation light from the first light source to the first main surface, the second analyzer includes
a second light source configured to generate the second irradiation light, and
a second optical member configured to guide the second irradiation light from the second light source to the second main surface, and
a difference between the size of the first irradiation region and the size of the second irradiation region is caused by a difference between an optical characteristic of the first optical member and an optical characteristic of the second optical member.

5. The semiconductor failure analysis device according to claim 1, wherein
the first analyzer includes a first lens configured to condense the first irradiation light on the first main surface such that the size of the first irradiation region becomes a predetermined size,
the second analyzer includes a second lens configured to condense the second irradiation light on the second main surface such that the size of the second irradiation region becomes a size different from the size of the first irradiation region, and
a magnification of the first lens is different from a magnification of the second lens.

6. The semiconductor failure analysis device according to claim 1, wherein
the first analyzer includes
a first light source configured to generate the first irradiation light, and
a first optical member configured to guide the first irradiation light from the first light source to the first main surface,
the second analyzer includes
a second light source configured to generate the second irradiation light, and
a second optical member configured to guide the second irradiation light from the second light source to the second main surface, and
a difference between a size of the first irradiation region and a size of the second irradiation region is caused by a difference between disposition of the first optical member and disposition of the second optical member.

7. The semiconductor failure analysis device according to claim 1, wherein
the first analyzer includes a first optical scanner configured to reflect the first irradiation light such that the first irradiation region moves along the first path,
the second analyzer includes a second optical scanner configured to reflect the second irradiation light such that the second irradiation region moves along the second path, and
a difference between the size of the first irradiation region and the size of the second irradiation region is caused by a difference between the first path and the second path.

8. A semiconductor failure analysis method for analyzing a semiconductor device, the semiconductor failure analysis method comprising:
preparing a first irradiation condition for first irradiation light emitted along a first path set on a first main surface of the semiconductor device and a second irradiation condition for second irradiation light emitted along a second path set on a second main surface that is a back side of the first main surface; and
acquiring an electric signal output from the semiconductor device while the semiconductor device is irradiated with the first irradiation light and the second irradiation light according to the first irradiation condition and the second irradiation condition set,
wherein preparing the first irradiation condition and the second irradiation condition, the first irradiation condition and the second irradiation condition are set such that a size of a first irradiation region formed on the first main surface with the first irradiation light is different from a size of a second irradiation region formed on the second main surface with the second irradiation light, and
wherein acquiring the electric signal output from the semiconductor device, the first irradiation light and the second irradiation light are emitted while a state where an entire one region of the first irradiation region and the second irradiation region overlaps the other region of the first irradiation region and the second irradiation region is maintained.

9. A semiconductor failure analysis device comprising:
a first analyzer configured to emit first irradiation light along a first path set on a first main surface of a semiconductor device;
a second analyzer configured to emit second irradiation light along a second path set on a second main surface that is a back side of the first main surface;
a first light detector configured to receive first response light from the semiconductor device, which is generated in accordance with the first irradiation light;
a second light detector configured to receive second response light from the semiconductor device, which is generated in accordance with the second irradiation light; and
a controller configured to control at least one of the first analyzer and the second analyzer, wherein
a size of a first irradiation region formed on the first main surface with the first irradiation light is different from a size of a second irradiation region formed on the second main surface with the second irradiation light, and
the controller is configured to output a control signal for emitting the first irradiation light and the second irradiation light while a state where an entire one region of the first irradiation region and the second irradiation region overlaps the other region of the first irradiation region and the second irradiation region is maintained.

10. The semiconductor failure analysis device according to claim 9, wherein
the size of the second irradiation region is smaller than the size of the first irradiation region, and
the controller is configured to output the control signal to the second analyzer.

11. The semiconductor failure analysis device according to claim 9, wherein
the first analyzer includes a first optical scanner configured to reflect the first irradiation light such that the first irradiation region moves along the first path,
the second analyzer includes a second optical scanner configured to reflect the second irradiation light such that the second irradiation region moves along the second path, and
the controller is configured to control the first optical scanner and the second optical scanner by using a ratio based on the size of the first irradiation region and the size of the second irradiation region.

12. The semiconductor failure analysis device according to claim 9, wherein
the first analyzer includes
a first light source configured to generate the first irradiation light, and
a first optical member configured to guide the first irradiation light from the first light source to the first main surface,
the second analyzer includes
a second light source configured to generate the second irradiation light, and
a second optical member configured to guide the second irradiation light from the second light source to the second main surface, and
a difference between the size of the first irradiation region and the size of the second irradiation region is caused by a difference between an optical characteristic of the first optical member and an optical characteristic of the second optical member.

13. The semiconductor failure analysis device according to claim 9, wherein
the first analyzer includes a first lens configured to condense the first irradiation light on the first main surface such that the size of the first irradiation region becomes a predetermined size,
the second analyzer includes a second lens configured to condense the second irradiation light on the second main surface such that the size of the second irradiation region becomes a size different from the size of the first irradiation region, and
a magnification of the first lens is different from a magnification of the second lens.

14. The semiconductor failure analysis device according to claim 9, wherein
the first analyzer includes
a first light source configured to generate the first irradiation light, and
a first optical member configured to guide the first irradiation light from the first light source to the first main surface,
the second analyzer includes
a second light source configured to generate the second irradiation light, and
a second optical member configured to guide the second irradiation light from the second light source to the second main surface, and
a difference between the size of the first irradiation region and the size of the second irradiation region is caused by a difference between disposition of the first optical member and disposition of the second optical member.

15. The semiconductor failure analysis device according to claim 9, wherein
the first analyzer includes a first optical scanner configured to reflect the first irradiation light such that the first irradiation region moves along the first path,
the second analyzer includes a second optical scanner configured to reflect the second irradiation light such that the second irradiation region moves along the second path, and
a difference between the size of the first irradiation region and the size of the second irradiation region is caused by a difference between the first path and the second path.

16. A semiconductor failure analysis method for analyzing a semiconductor device, the semiconductor failure analysis method comprising:
preparing a first irradiation condition for first irradiation light emitted along a first path set on a first main surface of the semiconductor device and a second irradiation condition for second irradiation light emitted along a second path set on a second main surface that is a back side of the first main surface; and
acquiring first response light from the semiconductor device while the semiconductor device is irradiated with the first irradiation light according to the first irradiation condition set and acquiring second response light from the semiconductor device while the semiconductor device is irradiated with the second irradiation light according to the second irradiation condition set,
wherein preparing the first irradiation condition and the second irradiation condition, the first irradiation condition and the second irradiation condition are set such that a size of a first irradiation region formed on the first main surface with the first irradiation light is different from a size of a second irradiation region formed on the second main surface with the second irradiation light, and
wherein acquiring first response light and second response light, the first irradiation light and the second irradiation light are emitted while a state where an entire one region of the first irradiation region and the second irradiation region overlaps the other region of the first irradiation region and the second irradiation region is maintained.

* * * * *